United States Patent
Shi et al.

(10) Patent No.: US 10,859,387 B2
(45) Date of Patent: Dec. 8, 2020

(54) SYSTEM AND METHOD FOR DETERMINING ROUTES OF TRANSPORTATION SERVICE

(71) Applicant: BEIJING DIDI INFINITY TECHNOLOGY AND DEVELOPMENT CO., LTD., Beijing (CN)

(72) Inventors: Yuan Shi, Beijing (CN); Yonggang Xue, Beijing (CN); Zhushi Wang, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 279 days.

(21) Appl. No.: 15/905,840

(22) Filed: Feb. 27, 2018

(65) Prior Publication Data

US 2018/0188049 A1     Jul. 5, 2018

Related U.S. Application Data

(63) Continuation of application No. PCT/CN2017/070860, filed on Jan. 11, 2017.

(30) Foreign Application Priority Data

Apr. 27, 2016  (CN) ............ 2016 1 0270774
Sep. 7, 2016   (CN) ............ 2016 1 0807745
(Continued)

(51) Int. Cl.
*G01C 21/00*  (2006.01)
*G01C 21/34*  (2006.01)
(Continued)

(52) U.S. Cl.
CPC ....... *G01C 21/343* (2013.01); *G01C 21/3423* (2013.01); *G01C 21/3484* (2013.01);
(Continued)

(58) Field of Classification Search
CPC ............. G01C 21/343; G01C 21/3423; G01C 21/3484; G01C 21/00; G06Q 50/30; G06Q 10/047; G08G 1/202
(Continued)

(56) References Cited

U.S. PATENT DOCUMENTS 5,204,817 A      4/1993  Yoshida
9,212,917 B2 *  12/2015  Lin ................. G08G 1/123
(Continued)

FOREIGN PATENT DOCUMENTS

CN    101140699 A    3/2008
CN    102495941 A    6/2012
(Continued)

OTHER PUBLICATIONS

First Office Action in Chinese Application No. 201610270774.5 dated Jan. 22, 2020, 22 pages.
(Continued)

*Primary Examiner* — Shardul D Patel
(74) *Attorney, Agent, or Firm* — Metis IP LLC

(57) ABSTRACT

A system and a method are provided for determining a preliminary route. The demand information of one or more transportation services is received from a plurality of passengers, the demand information of each of the plurality of passengers including a start and a destination; determine a plurality of preliminary stop areas based on the plurality of starts and the plurality of destinations; determine at least one preliminary route passing through the plurality of preliminary stop areas.

20 Claims, 21 Drawing Sheets

(30) Foreign Application Priority Data

Sep. 7, 2016 (CN) .......................... 2016 1 0808045
Sep. 7, 2016 (CN) .......................... 2016 1 0809376
Sep. 12, 2016 (CN) .......................... 2016 1 0818956

(51) Int. Cl.
*G06Q 10/04* (2012.01)
*G06Q 50/30* (2012.01)
*G08G 1/00* (2006.01)

(52) U.S. Cl.
CPC .......... *G06Q 10/047* (2013.01); *G06Q 50/30* (2013.01); *G08G 1/202* (2013.01)

(58) Field of Classification Search
USPC .............. 701/425, 410, 465, 537, 117, 533; 707/758; 705/6, 7.27, 26.4; 706/46
See application file for complete search history.

(56) References Cited

U.S. PATENT DOCUMENTS

| | | | | |
|---|---|---|---|---|
| 2013/0159206 | A1* | 6/2013 | Barahona | G06Q 50/28 705/338 |
| 2014/0280318 | A1 | 9/2014 | Simms et al. | |
| 2014/0358603 | A1* | 12/2014 | Viger | G06Q 10/08 705/7.12 |
| 2015/0100238 | A1* | 4/2015 | Cai | G01C 21/34 701/537 |
| 2016/0078762 | A1* | 3/2016 | Jouaux | G06Q 10/047 701/117 |
| 2017/0032291 | A1* | 2/2017 | Liu | G06Q 10/047 |
| 2017/0153642 | A1* | 6/2017 | Scheepjens | G05D 1/0212 |
| 2018/0330225 | A1 | 11/2018 | Zhuo | |

FOREIGN PATENT DOCUMENTS

| | | |
|---|---|---|
| CN | 102610091 A | 7/2012 |
| CN | 202923638 U | 5/2013 |
| CN | 103279534 A | 9/2013 |
| CN | 103324937 A | 9/2013 |
| CN | 103530540 A | 1/2014 |
| CN | 103761589 A | 4/2014 |
| CN | 103942312 A | 7/2014 |
| CN | 104572755 A | 4/2015 |
| CN | 104573874 A | 4/2015 |
| CN | 105070044 A | 11/2015 |
| CN | 105184387 A | 12/2015 |
| CN | 105184728 A | 12/2015 |
| CN | 105206041 A | 12/2015 |
| CN | 105427194 A | 3/2016 |
| CN | 105512447 A | 4/2016 |
| CN | 105515859 A | 4/2016 |
| CN | 105718368 A | 6/2016 |
| CN | 105719019 A | 6/2016 |
| CN | 106228275 A | 12/2016 |

OTHER PUBLICATIONS

International Search Report in PCT/CN2017/070860 dated Apr. 14, 2017, 4 pages.
Written Opinion in PCT/CN2017/070860 dated Sep. Apr. 14, 2017, 5 pages.
The Extended European Search Report in European Application No. 17788494.7 dated Dec. 21, 2018, 8 pages.
Examination Report in Australian Application No. 2017255282 dated Feb. 13, 2019, 5 pages.
Fang, Y. et al., A Real-Time Scheduling Method for a Variable-Route Bus in a Community, Advances in Intelligent Decision Technologies, pp. 239-247(2010).
The Office Action in European Application No. 17788494.7 dated Oct. 9, 2019, 9 pages.
The Second Examination Report in Australian Application No. 2017255282 dated Aug. 30, 2019, 7 pages.
Wang, Aijiao et al., Parallel Saving Heuristics for Vehicle Routing Problem, Logistics Technology, 65-67, 2003, 3 pages.
Anonymous, Taxicab, Wikipedia, 1-26, 2016, 26 pages.
Doug Rinckes et al., Open Location Code: An Open Source Standard for Address, Independent of Building Numbers and Street Names, 1-15, 2015, 15 pages.
The Second Office Action in Chinese Application No. 201610270774.5 dated Jun. 10, 2020, 25 pages.
Lin, Qing, Research on Evaluation Index and Model of Customized Public Transport Service—Taking Beijing as an Example, The World of Survey and Research, 2016, 5 pages.
Xu, Kangming et al., Discussion on Subscription Bus Services, Urban Transport of China, 11(5):24-27, 2013, 4 pages.

* cited by examiner

| wx4sj | wx4sn | wx4sp |
|-------|-------|-------|
| wx4ev | wx4ey | wx4ez |
| wx4et | wx4ew | wx4ex |

Determine a plurality of distances, wherein each distance of the plurality of distance is a distance between one of a plurality of preliminary stop areas in a preliminary route and one of a plurality of existing stop areas in an existing route — 1410

Determine whether the preliminary route matches the existing route based on the plurality of distances — 1420

```
┌─────────────────────────────────────────────────┐
│ Determine a plurality of distances, wherein each distance │ ─ 1510
│ is a distance between one of the plurality of preliminary │
│ stop areas in the preliminary route and one of a plurality │
│ of existing stop areas in the existing route │
└─────────────────────────────────────────────────┘
                         │
                         ▼
┌─────────────────────────────────────────────────┐
│ Determine a vector $V_a$ and a vector $V_b$ based on the │ ─ 1520
│                plurality of distances            │
└─────────────────────────────────────────────────┘
                         │
                         ▼
┌─────────────────────────────────────────────────┐
│ Determine whether the existing route matches the │ ─ 1530
│ preliminary route based on the vector $V_a$ and the vector │
│                       $V_b$                      │
└─────────────────────────────────────────────────┘
```

FIG. 15

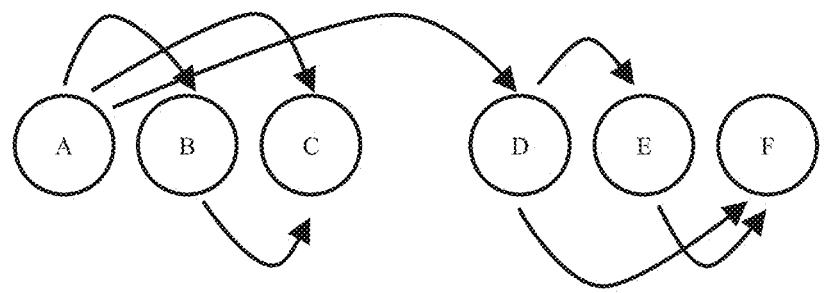
FIG. 19-A
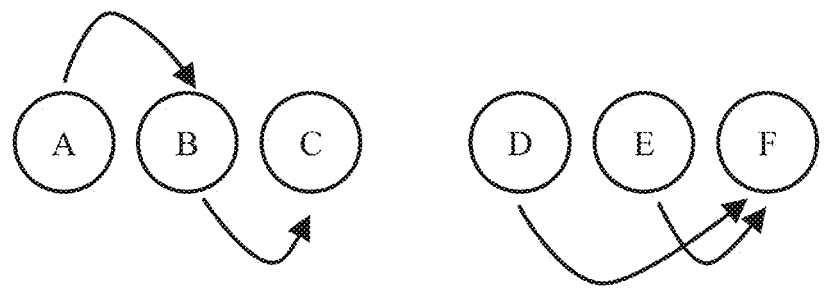
FIG. 19-B
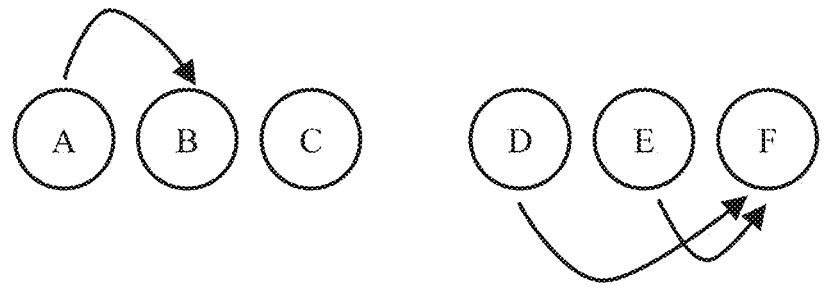
FIG. 19-C
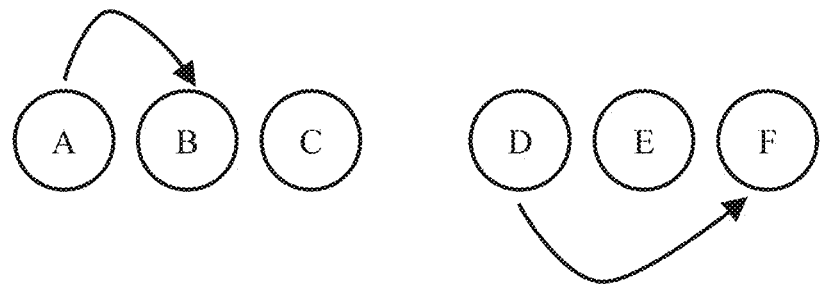
FIG. 19-D

SYSTEM AND METHOD FOR DETERMINING ROUTES OF TRANSPORTATION SERVICE

CROSS-REFERENCE TO RELATED APPLICATIONS

This application is a continuation of International Application No. PCT/CN2017/070860, filed on Jan. 11, 2017, which designates the United States of America and claims priority of Chinese Application No. 201610270774.5, filed on Apr. 27, 2016; Chinese Application No. 201610807745.8, filed on Sep. 7, 2016; Chinese Application No. 201610808045.0, filed on Sep. 7, 2016; Chinese Application No. 201610809376.6, filed on Sep. 7, 2016; and Chinese Application No. 201610818956.1, filed on Sep. 12, 2016, the contents of which are hereby incorporated by reference to their entirety.

TECHNICAL FIELD

This application relates generally to determination of routes for public transportation, and in particular, determination of routes for public transportation using a network-based, e.g., Internet-based, system and method.

BACKGOUND

Certain types of route-based public transportation services such as bus service, subway service, ferry service, etc., have been developed. The public transportation services are important as they may improve traffic capacities in densely populated areas such as a city. However, there are some problems such as inefficiency and bad user experiences in existing systems and methods for transportation system. Therefore, it is desirable to provide systems and methods for determining routes of transportation service to improve the efficiency and the user experience.

SUMMARY

In one aspect of the present disclosure, a system is provided. The system includes a processor and a computer-readable storage medium storing a set of instructions for determining a route of a public transportation service. When executing the set of instructions, the processor is directed to: obtain demand information of one or more transportation services from a plurality of passengers, the demand information of each of the plurality of passengers including a start and a destination; determine a plurality of preliminary stop areas based on the plurality of starts and the plurality of destinations; determine at least one preliminary route passing through the plurality of preliminary stop areas; for each of the at least one preliminary route, determine a matching degree between the preliminary route and an existing route; determine whether the matching degree between the preliminary route and the existing route is larger than a first threshold; and when the matching degree is smaller than the first threshold, determine the preliminary route as a candidate route.

In another aspect of the present disclosure, a method for determining a route of a transportation service is provided. The method includes obtaining demand information of one or more transportation services from a plurality of passengers, the demand information of each of the plurality of passengers including a start and a destination; determining a plurality of preliminary stop areas based on the plurality of starts and the plurality of destinations; determining at least one preliminary route passing through the plurality of preliminary stop areas; for each of the at least one preliminary route, determining a matching degree between the preliminary route and an existing route; determining whether the matching degree between the preliminary route and the existing route is larger than a first threshold; and when the matching degree is smaller than the first threshold, determining the preliminary route as a candidate route.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

FIG. 9 shows an exemplary map encompassing subareas according to some embodiments of the present disclosure;

FIG. 14 shows an exemplary process for determining whether the preliminary route matches the existing route according to some embodiments of the present disclosure;

FIG. 15 shows an exemplary process for determining whether the preliminary route matches the existing route according to some embodiments of the present disclosure;

FIGS. 19-A through 19-D illustrate examples of preliminary routes between multiple preliminary stop areas according to some embodiments of the present disclosure;

DETAILED DESCRIPTION

Figure 1:
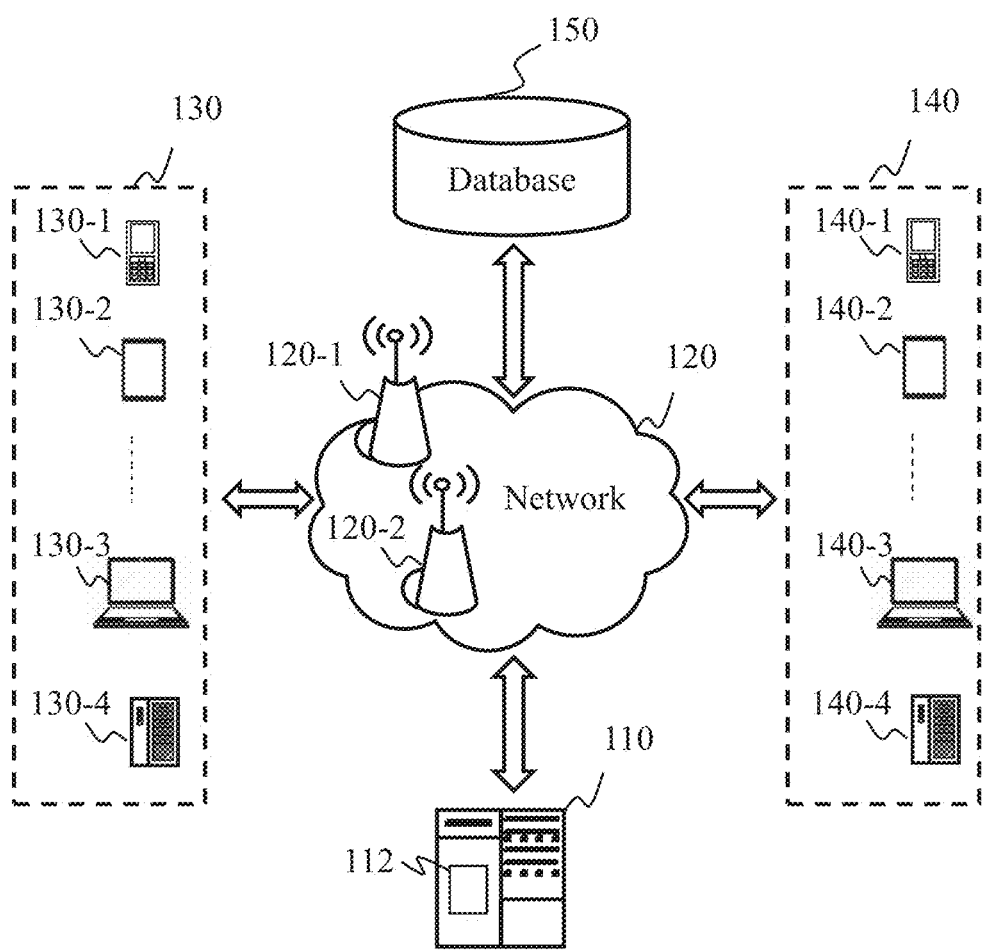
FIG. 1 is a block diagram of an exemplary transportation system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

It will be understood that the term "system," "device," "unit," and/or "module" used herein are one method to distinguish different components, elements, parts, section or assembly of different level in ascending order. However, the terms may be displaced by other expression if they may achieve the same purpose.

It will be understood that when a device, unit, or module is referred to as being "on," "connected to" or "coupled to" another device, unit, or module, it may be directly on, connected or coupled to, or communicate with the other device, unit, or module, or an intervening device, unit, or module may be present, unless the context clearly indicates otherwise. As used herein, the term "and/or" includes any and all combinations of one or more of the associated listed items.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

An aspect of the present disclosure provides online systems and methods for planning a route for a public transportation service. The online system obtain demand information from a plurality of passengers. The online system plans one or more route for the public transportation service based on the obtained demand information.

It should be noted that online on-demand transportation services, such as online public transportation, online taxi and/or test drive hailing, is a new form of service rooted only in post-Internet era. It provides technical solutions to users and service providers that could raise only in post-Internet era. In pre-Internet era, when a route for a public transportation is to be planned, the obtaining of demand information are by conducted by survey, or derived from statistics only. The survey or statistics is time-consuming and cost-inefficient. The planned route may be fixed. Changes to the planned route may only occur when a demographic structure or a metropolitan structure changes dramatically. Online public transportation, however, allows a passenger of the service to real-time and automatic distribute demand information to a service provider (host of the online public transportation). It also allows the service provider to respond to demand information and alter or change the planned route according the real-time demand information. Therefore, through Internet, the online public transportation systems may provide a much more efficient transportation platform for the passengers and the service provider that never met in a traditional pre-Internet public transportation system.

The term "user," "passenger," "requester," "service requester," and "customer" in the present disclosure are used interchangeably to refer to an individual, an entity or a tool that may request or order a public transportation service. Also, the term "provider," "service provider," and "supplier" in the present disclosure are used interchangeably to refer to an individual, an entity or a tool that may provide a service or facilitate the providing of the service. The term "user equipment" in the present disclosure may refer to a tool that may be used to demand a service, request a service, order a service, or facilitate the providing of the service.

An aspect of the present disclosure relates to online systems and methods for planning and designing routes for public or private transportation services, such as, a bus line, a metro line, a taxi route etc. To this end, the systems and methods may automatically collect demand information from individual passengers, and select demand-dense areas as stops. The systems and methods then may determine a route by connecting the selected stops.

It should be noted that automatically collecting service-demand information up to individual level is a new form of technology rooted only in post-Internet era. It provides technical solutions to users and service providers that could raise only in post-Internet era. In pre-Internet era, when an entity wishes to design a bus route, the entity can only roughly estimate demand density of an area without knowing exactly who and when and how many passengers were gathering exactly where for a transportation service. It is also impossible for the entity to real-time monitor the trend of the demand change and make service adjustment accordingly. The technical solution in the present disclosure, however, allows a user of the service to real-time and automatically distribute a service request to a vast number of individual service providers (e.g., online buses) distant away from the user. It also allows a plurality of service providers to respond to the service request simultaneously and in real-time. The transportation service provider further has a dynamic route and a flexible schedule. Thus, it is able to meet ever-changing or uncertain demands, such as a sudden rise of transportation demands (e.g., in an event). Therefore, through Internet, the online on-demand transportation systems in the present disclosure may provide a much more efficient transportation service for the users with huge demands for transportation that may never be anticipated or coped with in real-time in a traditional pre-Internet transportation service system.

FIG. 1 is a block diagram of an exemplary transportation system 100 according to some embodiments. For example, the transportation system 100 may be an online transportation service platform for transportation services such as taxi hailing, chauffeur service, express car, carpool, bus service, driver hire and shuttle service. The transportation system 100 may be an online platform including a server 110, a network 120, a requestor terminal 130, a provider terminal 140, and a database 150. The server 110 may include a processing engine 112.

In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the requestor terminal 130, the provider terminal 140, and/or the database 150 via the network 120. As another example, the server 110 may be directly connected to the requestor terminal 130, the provider terminal 140, and/or the database 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the service request to perform one or more functions described in the present disclosure. For example, the processing engine 112 may determine a target vehicle based on the service request obtained from the requestor terminal 130. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components in the transportation system 100 (e.g., the server 110, the requestor terminal 130, the provider terminal 140, and the database 150) may send information and/or data to other component(s) in the transportation system 100 via the network 120. For example, the server 110 may obtain/acquire service request or demand information from the requestor terminal 130 via the network 120. In some embodiments, the network 120 may be any type of wired or wireless network, or combination thereof. Merely by way of example, the network 130 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the transportation system 100 may be connected to the network 120 to exchange data and/or information.

In some embodiments, a requestor may be a user of the requestor terminal 130. In some embodiments, the user of the requestor terminal 130 may be someone other than the requestor. For example, a user A of the requestor terminal 130 may use the requestor terminal 130 to send a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may user the provider terminal 140 to receive a service request for a user D, and/or information or instructions from the server 110. In some embodiments, "requestor" and "requestor terminal" may be used interchangeably, and "provider" and "provider terminal" may be used interchangeably.

In some embodiments, the requestor terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, built-in device in the motor vehicle 130-4 may include an onboard computer, an onboard television, etc. In some embodiments, the requestor terminal 130 may be a device with positioning technology for locating the position of the requestor and/or the requestor terminal 130.

In some embodiments, the provider terminal 140 may be similar to, or the same device as the requestor terminal 130. In some embodiments, the provider terminal 140 may be a device with positioning technology for locating the position of the provider and/or the provider terminal 140. In some embodiments, the requestor terminal 130 and/or the provider terminal 140 may communicate with other positioning device to determine the position of the requestor, the requestor terminal 130, the provider, and/or the provider terminal 140. In some embodiments, the requestor terminal 130 and/or the provider terminal 140 may send positioning information to the server 110.

The database 150 may store data and/or instructions. In some embodiments, the database 150 may store data obtained from the requestor terminal 130 and/or the provider terminal 140. In some embodiments, the database 150 may store data and/or instructions that the server 110 may execute or use to perform exemplary methods described in the present disclosure. In some embodiments, database 150 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the database 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the database 150 may be connected to the network 120 to communicate with one or more components in the transportation system 100 (e.g., the server 110, the requestor terminal 130, the provider terminal 140, etc.). One or more components in the transportation system 100 may access the data or instructions stored in the database 150 via the network 120. In some embodiments, the database 150 may be directly connected to or communicate with one or more components in the transportation system 100 (e.g., the server 110, the requestor terminal 130, the provider terminal 140, etc.). In some embodiments, the database 150 may be part of the server 110.

In some embodiments, one or more components in the transportation system 100 (e.g., the server 110, the requestor terminal 130, the provider terminal 140, etc.) may have a permission to access the database 150. In some embodiments, one or more components in the transportation system 100 may read and/or modify information relating to the requestor, provider, and/or the public when one or more conditions are met. For example, the server 110 may read and/or modify one or more users' information after a service. As another example, the provider terminal 140 may access information relating to the requestor when receiving a service request from the requestor terminal 130, but the provider terminal 140 may not modify the relevant information of the requestor.

In some embodiments, information exchanging of one or more components in the transportation system 100 may be achieved by way of demanding a service. The object of the service demand may be any product. In some embodiments, the product may be a tangible product, or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile Internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a public transportation service software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

Figure 2:
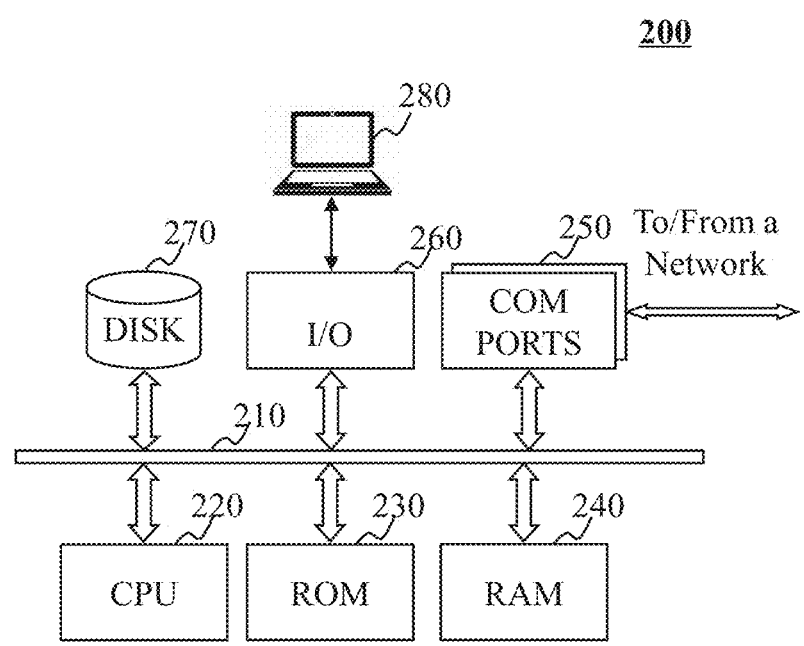
FIG. 2 is a schematic diagram illustrating exemplary hardware and software components of a computing device according to some embodiments of the present disclosure.

FIG. 2 is a schematic diagram illustrating exemplary hardware and software components of a computing device 200 on which the server 110, the requestor terminal 130, and/or the provider terminal 140 may be implemented according to some embodiments of the present disclosure. For example, the processing engine 112 may be implemented on the computing device 200 and configured to perform functions of the processing engine 112 disclosed in this disclosure.

The computing device 200 may be a general purpose computer or a special purpose computer, both may be used to implement an on-demand system for the present disclosure. The computing device 200 may be used to implement any component of the on-demand service as described herein. For example, the processing engine 112 may be implemented on the computing device 200, via its hardware, software program, firmware, or a combination thereof. Although only one such computer is shown, for convenience, the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a central processing unit (CPU)

220, in the form of one or more processors, for executing program instructions. The exemplary computer platform may include an internal communication bus 210, program storage and data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, RAM 240, and/or other type of non-transitory storage medium to be executed by the CPU 220. The methods and/or processes of the present disclosure may be implemented as the program instructions. The computing device 200 also includes an I/O component 260, supporting input/output between the computer and other components therein such as user interface elements 280. The computing device 200 may also receive programming and data via network communications.

Merely for illustration, only one CPU and/or processor is described in the computing device 200. However, it should be note that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
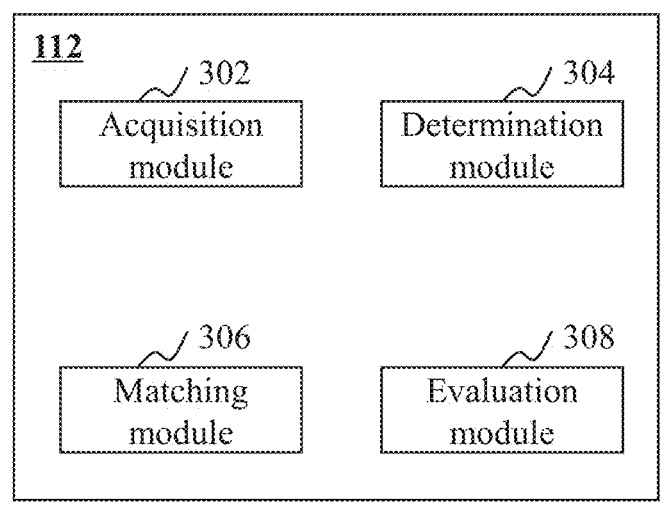
FIG. 3 is a block diagram illustrating an exemplary processing engine according to some embodiments of the present disclosure.

FIG. 3 is a block diagram illustrating an exemplary processing engine 112 according to some embodiments of the present disclosure. The processing engine 112 may include an acquisition module 302, a determination module 304, a matching module 306, and an allocation module 308.

The acquisition module 302 may be configured to obtain demand information from a plurality of requestors. As used herein, the system 100 may generate an order based on a demand for an on-demand service sent by a requestor. It should be noted that in the disclosure there is no substantial difference between an order and a demand.

The on-demand service may be a transportation service for a taxi, a private vehicle, a bus, a truck, a test drive, a designated driving, a bus, a subway train, a ferry, or the like, or a combination thereof. In some embodiments, the on-demand service may be any on-line service, such as booking a meal, shopping, or the like, or a combination thereof. In some embodiments, the requesters may provide demand information to the system 100. The demand information may include multiple starts and destinations.

The acquisition module 302 may obtain demand information from the requestor terminal 130 via the network 120. The acquisition module 302 may further obtain features (e.g., a start, a destination) of the demand information.

The determination module 304 may be configured to determine one or more preliminary routes according to demand information from requestor terminals 130. The determination module 304 may apply one or more clustering algorithms to the starts and destinations in the demand information and identify or determine one or more preliminary stop areas prior to the determination of the preliminary routes.

The matching module 306 may be configured to determine whether a preliminary route matches an existing route. As used herein, an existing route may refer to a route that is currently or was once in operation. The matching module 306 may use a matching degree to indicate the extent to which a preliminary route matches an existing route. For example, if the matching degree between a route and itself may be one (1). The matching module 306 may determine the matching degree using parameters associated with the routes. The parameters may include coordinates of stop areas in the routes, distances between stop areas in the routes, number of redundant stop areas in the preliminary route, etc. As used herein, a redundant stop area may refer to a stop area in the preliminary route that is reasonably close to one stop area in the existing route for an ordinary person in the art. For example, if a distance between a stop area $S_1$ in a preliminary route A and a stop area $S_2$ in an existing route B is less than a threshold, such as 500 meters, 1 kilometer, or 1.5 kilometer, the system 100 may determine that the stop area $S_1$ is a redundant stop area.

The evaluation module 308 may evaluate a preliminary route and generate a score. The evaluation module 308 may generate the score according to one or more features associated with the preliminary route. As used herein, the features may include at least one of a total length of the preliminary route, an estimated driving duration of the preliminary route, charge information relating to the preliminary route; or a number of the plurality of passengers.

The evaluation module 308 may determine whether the score is larger than a second threshold. When the score is larger than the second threshold, the evaluation module 308 may determine the preliminary route as a premium route. As used herein, a premium route may refer to a route that is commercially profiting, beneficial, or convenient.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the acquisition module 302 may be integrated in the determination module 304 as a single module which may both obtain demand information and determine preliminary routes according to the demand information.

Figure 4:
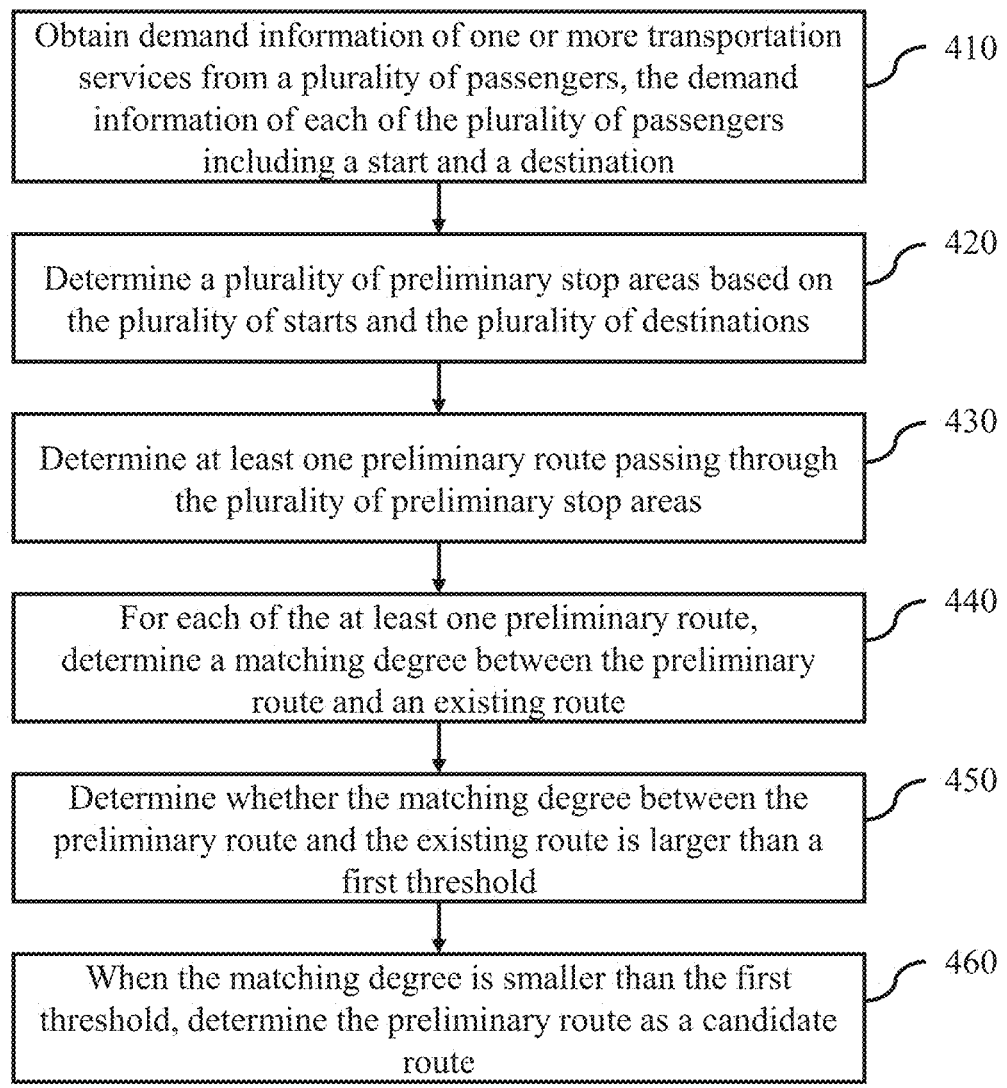
FIG. 4 is a flowchart of an exemplary process for determining a route for a transportation service according to some embodiments of the present disclosure.

FIG. 4 is a flowchart of an exemplary process 400 for determining a route for a transportation service according to some embodiments of the present disclosure. In some embodiments, the process 400 may be implemented in the transportation system 100 as illustrated in FIG. 1. For example, the process 400 may be implemented as one or more sets of instructions and stored in database 140 and/or storage 220, and called and/or executed by processor 210.

The processor 210 may be a processor 210 of a computer server supporting a transportation service platform. The platform may be an Internet-based platform that connects transportation service providers and passengers through Internet.

In step 410, processor 210 may obtain demand information of one or more transportation services from a plurality of passengers. The transportation services may be public transportation services, for example, a bus service, a subway service, and/or a ferry service, etc. The transportation services may also be private transportation services. For example, the transportation service may include a taxi transportation service and/or a carpool transportation service, etc. The demand information may indicate a demand level for a public transportation service. For example, when the demand level between place A and place B is high enough, it may indicate that commercially it is worthwhile to open a public transportation service between place A and place B. The demand information of each of the plurality of passengers may include a start and a destination.

Figure 5:
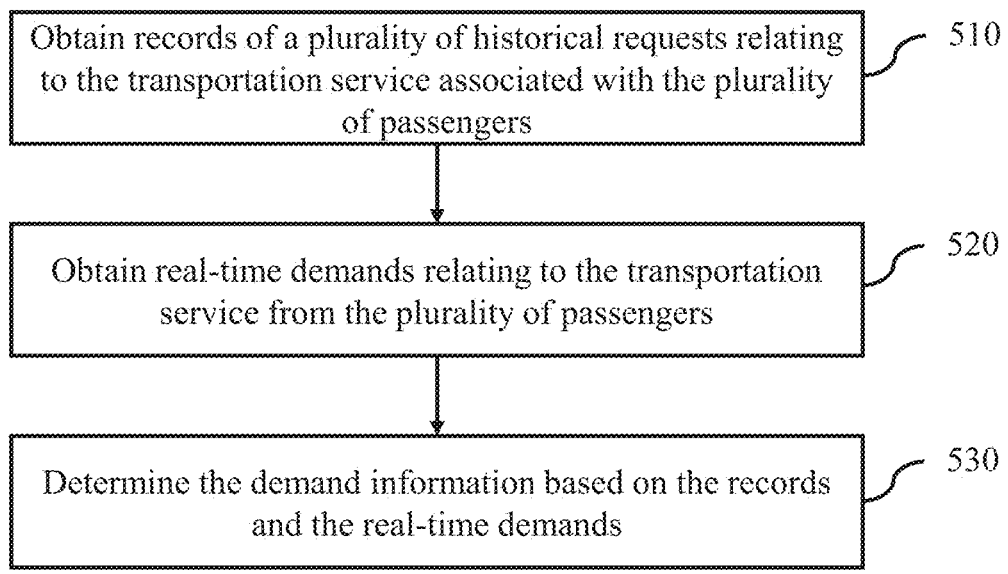
FIG. 5 shows an exemplary process for determining demand information for a transportation service according to some embodiments of the present disclosure.

FIG. 5 shows an exemplary process 500 for determining demand information of a transportation service (e.g., a target transportation service). In some embodiments, the process 500 may be implemented in the transportation system 100 as illustrated in FIG. 1. For example, the process 500 may be implemented as one or more sets of instructions and stored in database 140 and/or storage 220, and called and/or executed by processor 210. Merely for the purpose of illustration, the present disclosure select a public transportation service as an example of the target transportation. One of ordinary skill in the art would understand that the same process may be applied to private transportation service selection as well. For example, the process 1100 may also be implemented in determining demand information for taxi services and/or carpool services. In some embodiments, the demand information may be derived from historical records. In some embodiments, the demand information may be obtained by collecting from the passengers requests for a public transportation service in a real-time manner.

In step 510, processor 210 may obtain records of a plurality of historical requests for the transportation service associated with a plurality of passengers. The records of the plurality of historical requests may be obtained from a database regularly or on-demand. The historical records may include records of one or more existing routes of public transportation and/or records of one or more transactions of alternative transportation services. The historical requests may be made by a variety of passengers. Each of the historical requests may be associated with an individual. The historical records may be within a time period. The time period may be set manually or adaptively according to real scenarios. The existing routes of public transportation service may include a bus line, a subway line, or a ferry line, etc. The alternative transportation services may offer alternative options to passengers other than the public transportation service. The alternative transportation services may include, a taxi service, an Uber™ service, a private transportation service, a lift service, a shared vehicle service, a vehicle rental service, etc. A passenger may have a frequency of usage for a certain alternative transportation service. In some embodiments, the processor 210 may obtain the records for the certain alternative transportation service when or only when a frequency of usage for the certain alternative transportation service exceeds a predetermined threshold. An alternative transportation services may be assigned a weighting factor. Processor 210 may use the weighting factor of the alternative transportation service to determine an estimated demand level for the public transportation service. The weighting factor may be lesser than one (1). The weighting factor may be determined according to the similarity between the public transportation service and the alternative transportation service. For example, the weighting factor for a lift service or a shared vehicle service may be greater than that for a taxi service. Alternatively, a search engine may collect users' search history associated with a public transportation service to derive demands of the users (as potential passengers) for the public transportation service. The search engine may be a web search engine, a map search engine, etc. The search engine may provide the derived demands to the provider of the public transportation service.

In step 520, processor 210 may obtain real-time demands for the public transportation service from the plurality of passengers. The real-time demands may be automatically collected by the system 100 through individual user terminal in real time. The demands may be also collected by a survey. The survey may be conducted by an entity, one or more persons, or the public transportation service provider. For example, a company may conduct a survey aiming to collect demands for a public transportation service among its employees. The company may provide a result of the survey to a provider of the public transportation service. The survey may include a face-to-face survey or an online survey. The face-to-face survey may be conducted, for example, in questionnaire or other forms. The face-to-face survey may be conducted in a population-dense area, such as, entrances of busy subway stations. The online survey may be conducted, for example, by online questionnaire or forms filled by passengers. The online questionnaire or forms may be presented in the user interface of a transportation service application. As the collected demands or requests may indicate a strong desire for acquire the transportation service, the demand information collected from passengers may be assigned priority over the demand information derived from historical records.

For example, if the time period is from July $1^{st}$ to July $15^{th}$, then processor 210 may obtain the historical records for public transportation services, the taxi service, the Uber™ service, the lift service, the shared vehicle service, the vehicle rental service, and demands for the public transportation service derived from search history of users of a search engine. Also, processor 210 may obtain real-time demands within the time period from July $1^{st}$ to July $15^{th}$.

In step 530, processor 210 may determine the demand information based on the records and the real-time demands. The demand information may indicate the number of passengers requesting and/or requested for public transportation service in a certain area. Processor 210 may determine the demand information according to the records and the weighting factors of different transportation services in the records. For example, there are ten (10) passengers taking taxi service in District A according to records of historical requests. The weighting factor for taxi service is 0.3. There are also five (5) passengers sending real-time demands for getting on a bus in District A. Then processor 210 may determine that eight ($8=10\times0.3+5$) passengers may want to take a bus in District A in total.

In step 420, processor 210 may determine a plurality of preliminary stop areas based on the plurality of starts and the plurality of destinations. For example, a preliminary stop area may be an area where the number of starts and/or destination concentrates, i.e., a density of the starts and/or the destinations is higher than a predetermined value. A preliminary stop area may include one or more stop positions. The stop positions may allow passengers to get on/off a vehicle of the public transportation service. The stop position may be fixed. Alternatively, the stop position may be changeable according to the variation of demand information. For example, if the processor 210 determines, according to the demand information, that the highest density of the destinations today appears in an area (i.e., "a first area") different from the area (i.e., "a second area") of highest density of destinations yesterday, the processor 210 may change the preliminary stop area from the second area to the first area.

Processor 210 may determine the plurality of preliminary stop areas using an algorithm. Exemplary algorithms may include, a clustering algorithm, an optimization algorithm, or the like. The clustering algorithm may include a k-means clustering algorithm, a fuzzy c-mean clustering algorithm, a hierarchical clustering algorithm, a Gaussian clustering algorithm, a minimum spanning tree (MST) based clustering algorithm, a kernel k-means clustering algorithm, a density based clustering algorithm, or the like. The optimization algorithm may include a random search, a Newton's method, a Quasi-Newton method, an evolutional algorithm, a coordinate descent method, a proximal gradient method, a gradient descent method, a steepest descent method, a conjugate gradient method, a bi-conjugate gradient method, etc.

In some scenarios, the historical records and/or the collected real-time demands for a certain passenger may include multiple starts and/or destinations. Some of the starts/destinations may be close to each other. The clustering algorithm may generate a cluster of these closely-separated starts/destinations.

Figure 6:
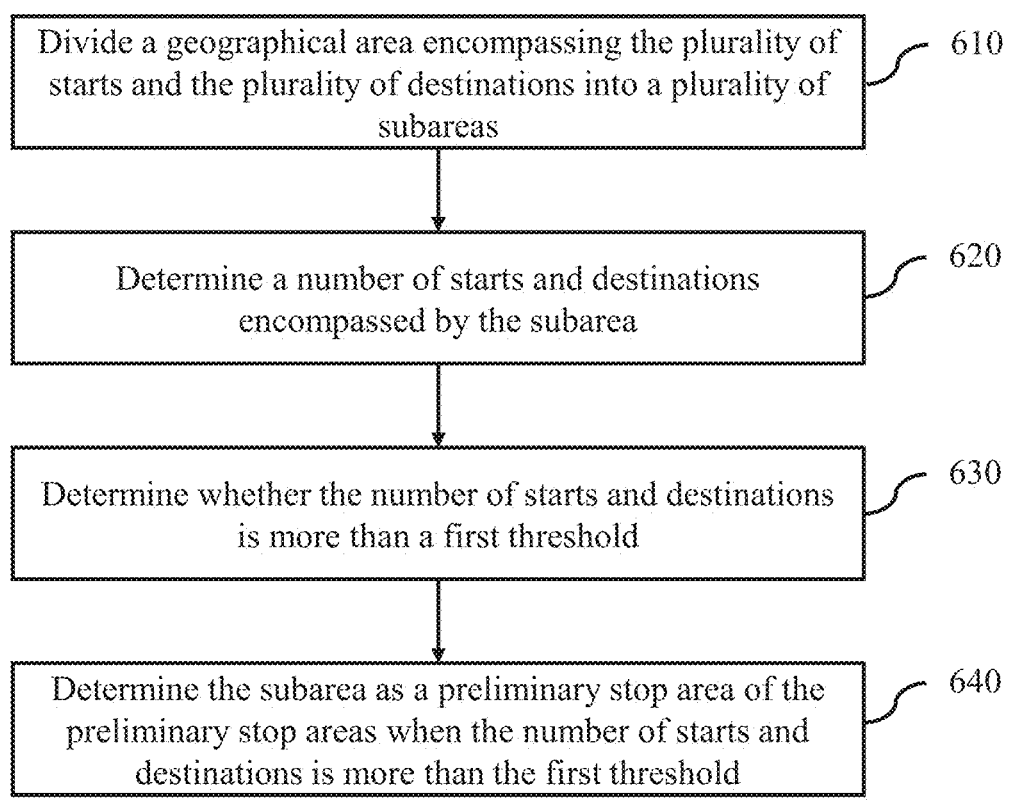
FIG. 6 shows an exemplary process for determining a plurality of preliminary stop areas according to some embodiments of the present disclosure.

FIG. 6 shows an exemplary process 600 for determining a plurality of preliminary stop areas. In some embodiments, the process 600 may be implemented in the transportation system 100 as illustrated in FIG. 1 for example, the process 600 may be implemented as one or more sets of instructions and stored in database 140 and/or storage 220, and called and/or executed by processor 210. In some embodiments, the plurality of preliminary stop areas may be planned for a geographical area. The geographical area may be a manually determined area. The manually determined area may be a metropolitan area, an urban area, a suburban area, a business area, or a residential area.

In step 610, processor 210 may divide a geographical area encompassing a plurality of starts and a plurality of destinations into a plurality of subareas. The division may be based on coordinates of the geographical area. The coordinates may include a longitudinal coordinate and a latitudinal coordinate. The subareas may be equal or unequal in size. In some embodiments, when the subareas are equal in size, the subareas may be substantially rectangular if the size of the geographical area is small compared to the total surface area of the earth. Further, processor 210 may set the length and width of the rectangular subareas. Specifically, processor 210 may set each of the subareas to be substantially square. Thus, processor 210 may only need to set the length of one side of the square subarea. In practical scenarios, since the number of starts and destinations may be quite large, processor 210 may consume a lot of resources when dealing with the coordinates included in the demand information. Processor 210 may convert or map the coordinates of the geographical area into a character string with a predetermined length to reduce consumption of resources. Thus a subarea may be represented by a character string with a certain length. For example, the Dascom Building in Haidian District, the City of Beijing, China (40.045520, 116.308430) may be converted into an original character string "wx4eyd" with a length of six (6). Processor 210 may conduct the conversion using a look-up table. The look-up table may be based on a geocoding rule, such as, Geohash, Geohash-36, Georef, open location code, etc. The look-up table may be stored in storage 220 or server 110 to be accessed or retrieved by processor 210.

A character string with a longer length may represent a smaller area compared to the area represented by a character string with a shorter length.

For each subarea of the plurality of subareas, in step 620, processor 210 may determine a number of starts and destinations encompassed by the subarea. Processor 210 may count the number of starts and destinations in the subarea.

In step 630, processor 210 may determine whether the number of starts and destinations in the subarea is more than a first threshold. The first threshold may be predetermined or determined adaptively according to one or more factors. The factors may include the size of the geographical area, the size of subarea, a number of the subareas in the geographical area, the total number of starts and destinations in the geographical area, etc.

In step 640, processor 210 may determine the subarea as a preliminary stop area of the preliminary stop areas when the number of starts and destinations is more than the first threshold. When the subarea has a larger number of starts and destinations than the first threshold, the subarea may be a demand-dense area with a high demand level for a public transportation service. Thus, the subarea may need to be included in a newly planned route to meet the demands of passengers. If the subarea has a less number of starts and destinations than the first threshold, the subarea may be a demand-scarce area with a low demand level for the public transportation service. In some embodiments, the subarea may be neglected and will not be included in the newly planned routes to enhance the efficiency of the newly planned routes.

Figure 7:
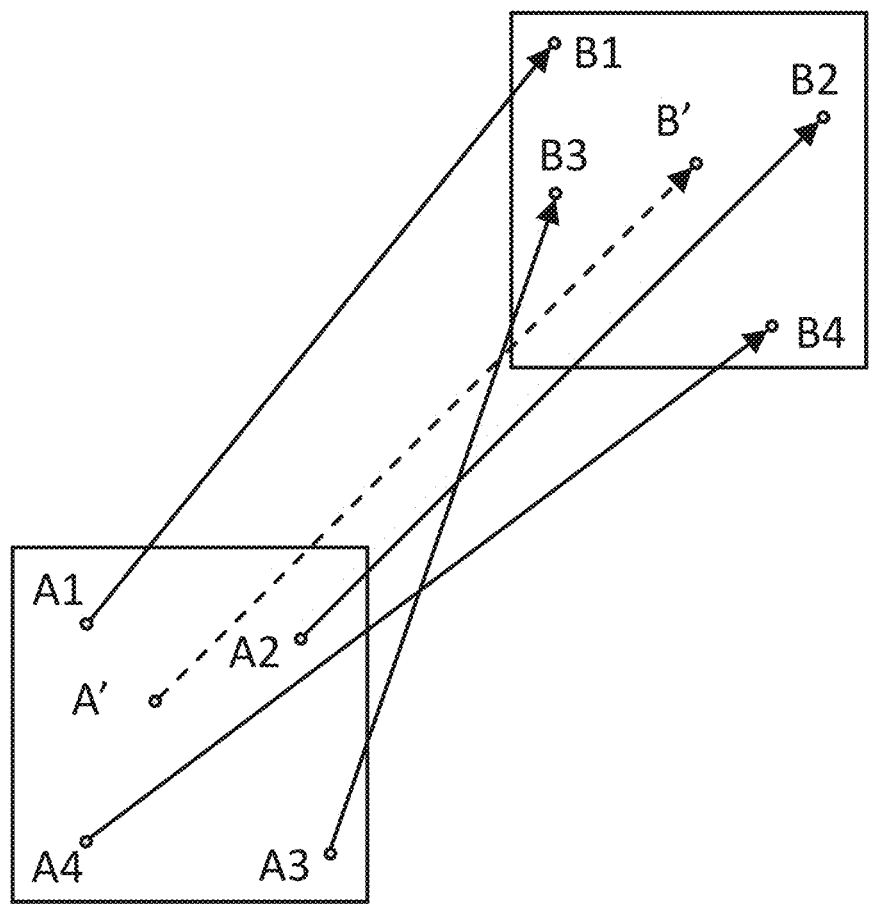
FIG. 7 shows an exemplary map encompassing two subareas according to some embodiments of the present disclosure.

For example, FIG. 7 shows an exemplary map encompassing two subareas. One or more passengers want to get on a vehicle of a transportation service at Location A1 and get off at Location B1. One or more passengers want to get on the vehicle of the transportation service at Location A2 and get off at Location B2. One or more passengers want to get on the vehicle of the transportation service at Location A3 and get off at Location B3. One or more passengers want to get on the vehicle of the transportation service at Location A4 and get off at Location B4. A subarea centered at Location A' contains the four starts, A1, A2, A3, and A4. A subarea centered at Location B' contains the four destinations, B1, B2, B3, and B4. Processor 210 may determine the subarea centered at Location A' and the subarea centered at Location B' as two preliminary stop areas. Processor 210 may determine a preliminary route, as shown in the dashed arrowed line from Location A' to Location B'.

Figure 8:
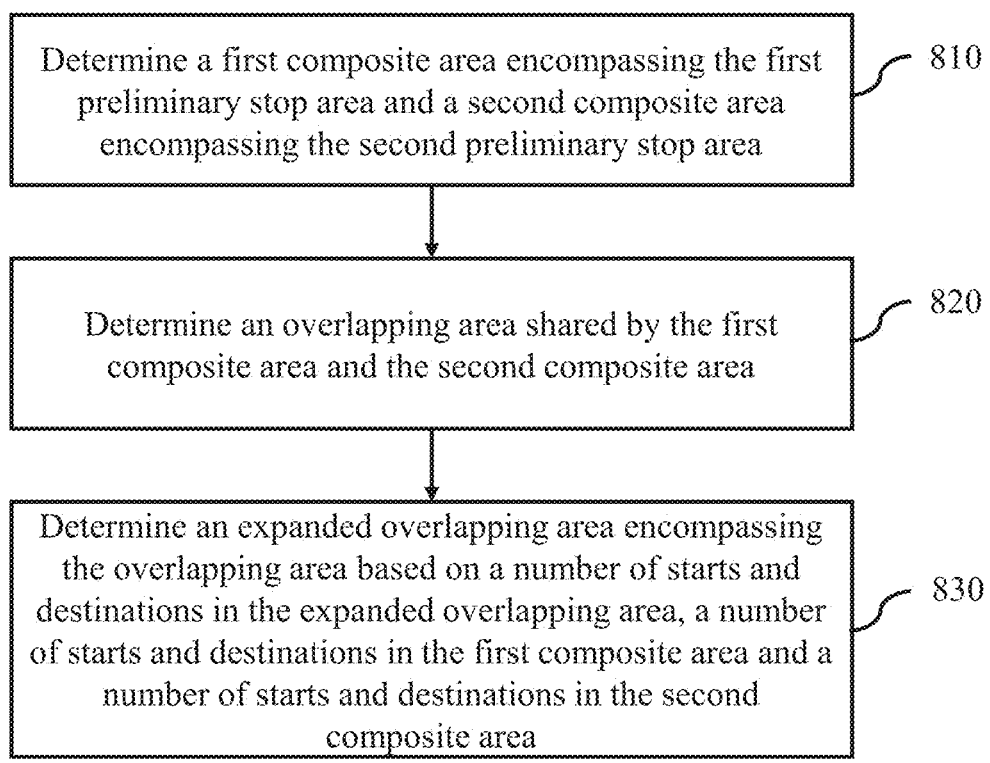
FIG. 8 shows an exemplary process for merging or integrating two or more preliminary stop areas according to some embodiments of the present disclosure.

In some embodiments, a single demand-dense area, such as, an office building, may be partitioned into more than one subarea. To avoid such scenario, FIG. 8 shows an exemplary process 800 for merging or integrating two or more preliminary stop areas. FIG. 9 shows an exemplary map encompassing nine subareas. In some embodiments, the process 800 may be implemented in the transportation system 100 as illustrated in FIG. 1. For example, the process 800 may be implemented as one or more sets of instructions and stored in database 140 and/or storage 220, and called and/or executed by processor 210.

Processor 210 may obtain a plurality of preliminary stop areas including a first preliminary stop area and a second preliminary stop area. The first preliminary stop area may be close to the second preliminary stop area.

In step 810, processor 210 may determine a first composite area encompassing the first preliminary stop area and a second composite area encompassing the second preliminary stop area. A composite area may be an expanded area with its center coincided with a center of preliminary stop area. In some embodiments, the composite area may be determined by expanding each side of the preliminary stop area by a predetermined distance. The composite area may have more than one subarea, among which the preliminary stop area is included. In some embodiments, the composite area may be determined using the original character string. For example, a preliminary stop area may be represented by an original character string of a length of six (6). Its corresponding composite area may be a shorter character string of a length of five (5) or four (4). The shorter character string may be obtained by deleting one or more bits from the original character string. For example, the composite area encompassing Dascom Building may be represented as "wx4ey". Processor 210 may determine more than two composite areas, such as "wx4sj", "wx4sn", "wx4sp", "wx4ev", "wx4ey", "wx4ez", "wx4et", "wx4ew", and "wx4ex", as shown in FIG. 9, after reducing the length of the character strings to five (5).

In step 820, processor 210 may determine an overlapping area shared by the first composite area and the second composite area. The overlapping area may include one or more subarea.

In step 830, processor 210 may determine an expanded overlapping area encompassing the overlapping area. The expanded overlapping area may be determined by expanding the sides of the overlapping area. In some embodiments. Alternatively, the expanded overlapping area may include several subareas bordering the overlapping area. The expanded overlapping area may have a center coincided with a center of the overlapping area.

In some scenarios, if a single demand-dense area is partitioned into two subareas, the two subareas may be adjacent. Thus the composite areas of each of the two subareas may share an overlapping area. The overlapping area may also be demand-dense. Processor 210 may merge the first composite area and the second composite area based on a number of starts and destinations in the expanded overlapping area; a number of starts and destinations in the first composite area; and a number of starts and destinations in the second composite area.

Figure 10:
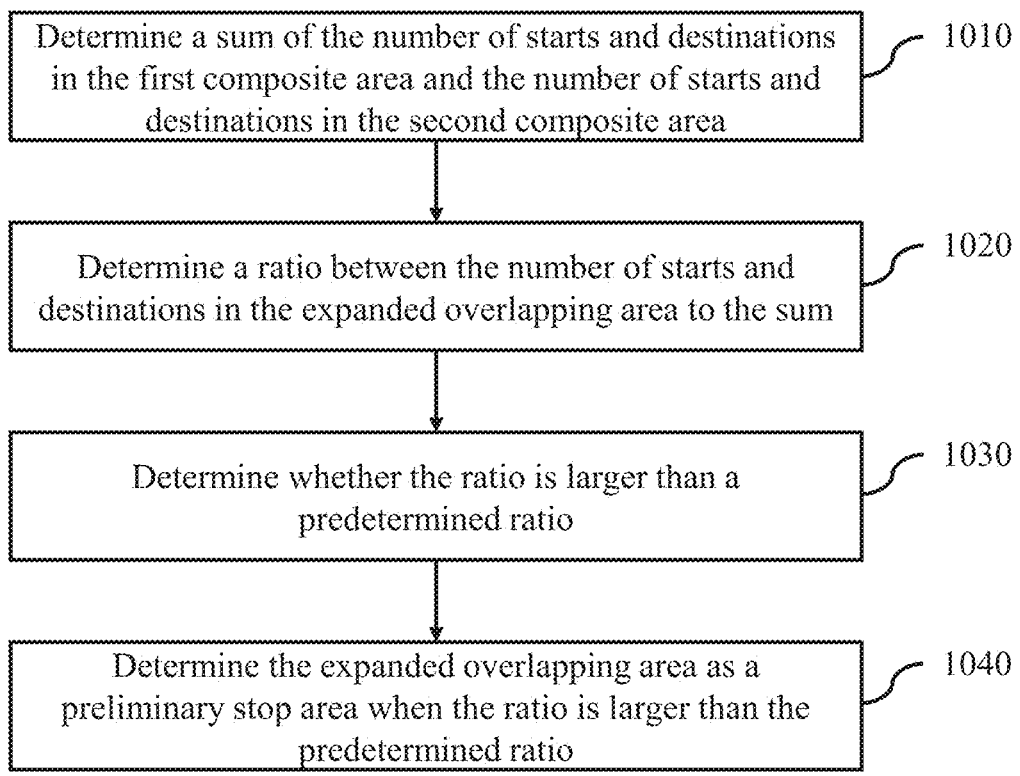
FIG. 10 shows an exemplary process for determining a preliminary stop area based on two composite areas according to some embodiments of the present disclosure.

FIG. 10 shows an exemplary process 1000 for determining a preliminary stop area based on two composite areas. In some embodiments, the process 1000 may be implemented in the transportation system 100 as illustrated in FIG. 1. For example, the process 1000 may be implemented as one or more sets of instructions and stored in database 140 and/or storage 220, and called and/or executed by processor 210.

In step 1010, processor 210 may determine a sum of the number of starts and destinations in the first composite area and the number of starts and destinations in the second composite area.

In step 1020, processor 210 may determine a ratio between the number of starts and destinations in the expanded overlapping area to the sum.

In step 1030, processor 210 may determine whether the ratio is larger than a predetermined ratio. The value of the predetermined ratio may be set according to various factors. The various factors may include the sizes of the subareas, the sizes of the first composite area and the second composite area, etc.

In step 1040, processor 210 may determine the expanded overlapping area as a preliminary stop area when the ratio is larger than the predetermined ratio.

Figure 11:
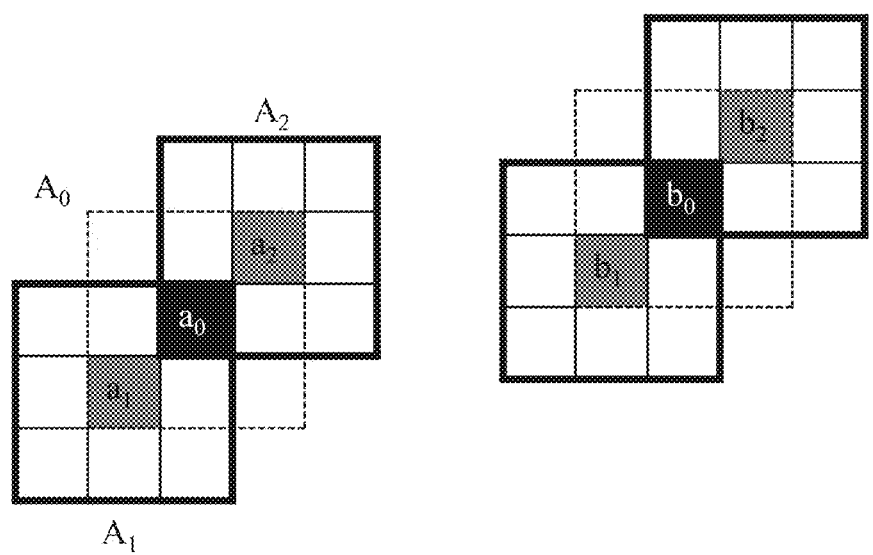
FIG. 11 shows an exemplary map encompassing composite areas and expanded overlapping areas according to some embodiments of the present disclosure.

FIG. 11 shows an exemplary map encompassing composite areas and expanded overlapping areas.

As an example, FIG. 11 shows a first composite area $A_1$, a second composite area $A_2$, a third composite area $B_1$, and a fourth composite area $B_2$. Each of the four composite areas $A_1$, $A_2$, $B_1$, and $B_2$ include nine subareas. The first composite area $A_1$ may correspond a first subarea $a_1$. The second composite area $A_2$ may correspond a second subarea $a_2$. The first composite area $A_1$ and second composite area $A_2$ may share an overlapping area $a_0$. A first expanded overlapping area $A_0$ may be centered in $a_0$ and include additional eight (8) subareas besides $a_0$. The third composite area $B_1$ may correspond a third subarea $b1$. The fourth composite area $B_2$ may correspond a fourth subarea $b_2$. The third composite area $B_1$ and fourth composite area $B_2$ may share an overlapping area $b_0$. A second expanded overlapping area $B_0$ may be centered in $b_0$ and include additional eight (8) subareas besides $b_0$.

According to an example, if the number of starts and destinations in the first composite area $A_1$ is 100 and the number of starts and destinations in the second composite area $A_2$ is 200, the sum of the starts and destinations in the composite areas $A_1$ and $A_2$ is 300. The predetermined ratio is set to be 80%. The number of starts and destinations in the first expanded overlapping area $A_0$ is 260. Processor 210 may determine the ratio between the number of starts and destinations in the first expanded overlapping area $A_0$ to the sum to be 260/300, approximately 87%. The ratio is larger than the predetermined ratio of 80%. Processor 210 may determine the first expanded overlapping area $A_0$ as the result of the merging of composite areas $A_1$ and $A_2$. The first expanded overlapping area $A_0$ may be determined as a preliminary stop area for the route of a public transportation service. Passengers from the composite areas $A_1$ or $A_2$ may get on/off a vehicle of the public transportation service passing through the expanded overlapping area $A_0$. Since the expanded overlapping area $A_0$ corresponds to 260 starts and destinations in total. The number of starts and destinations in the area $A_0$ is larger than the number of starts and destinations in the area $A_1$ or $A_2$. Thus, it may enhance the efficiency of the public transportation service to set the area $A_0$, rather than area $A_1$ or $A_2$, as a stop area.

It should be noted that processor 210 may repeatedly merge composite areas. For example, processor 210 may further merge the expanded overlapping area $A_0$ and a nearby composite area $A_4$ (not shown) using the same condition. The merging may end when the number of starts and destinations in the expanded overlapping area, say $A_n$, does not increase after a merging.

In step 430, processor 210 may determine at least one preliminary route passing through the plurality of preliminary stop areas. The preliminary route may include at least one segment. Each segment may connect two preliminary stop areas nearby. In some embodiments, a preliminary stop area may be associated with multiple preliminary routes to multiple preliminary stop areas. Each of the multiple preliminary routes may lead to a preliminary stop area.

In some embodiments, processor 210 may determine a stop position for each of the plurality of preliminary stop areas. The stop position may be a centroid or any other point within the preliminary stop area. A vehicle of the transportation service may stop at the stop position and allow passengers to board. In some embodiments, the location of the stop position may be dynamic according to the real-time demand information from the passengers. Processor 210 may determine at least one preliminary routes by connecting the stop positions.

In step 440, for each of the plurality of preliminary routes, processor 210 may determine a matching degree between the preliminary route and an existing route. The matching degree may indicate the extent to which the preliminary route matches the existing route. When the matching degree between a route A and a route B is high, the route A may resemble or have a large portion similar to the route B. In some embodiments, the matching degree between a route and itself may be one (1).

In step 450, processor 210 may determine whether the matching degree between the preliminary route and the existing route is larger than a first threshold.

Figure 12:
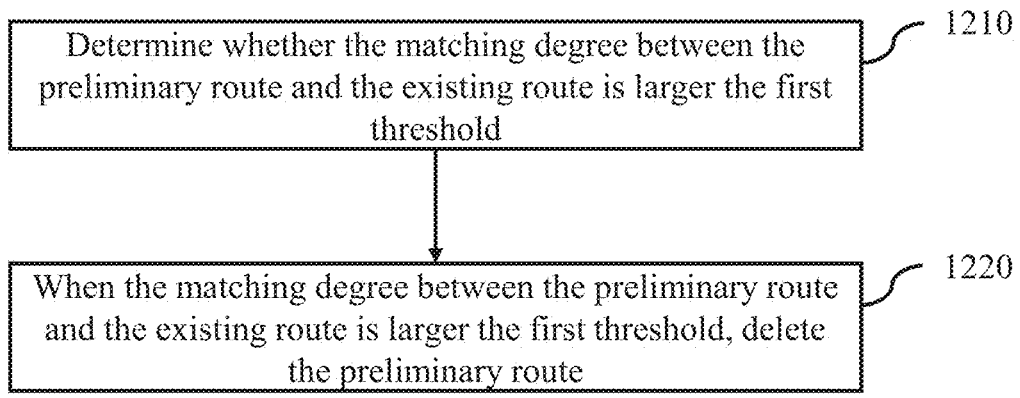
FIG. 12 shows an exemplary process for deleting a preliminary route according to some embodiments of the present disclosure.

In step 460, when the matching degree is smaller than the first threshold, processor 210 may determine the preliminary route as a candidate route. In some embodiments, processor 210 may determine whether the matching degree between the preliminary route and the existing route is larger than the first threshold. If the matching degree between the preliminary route and the existing route is larger than the first threshold, processor 210 may delete the preliminary as being redundant. To reduce manual manipulations, processor 210 may delete the preliminary route matching one or more existing routes automatically, FIG. 12 shows an exemplary process 1200 for deleting a preliminary route. In some embodiments, the process 1200 may be implemented in the transportation system 100 as illustrated in FIG. 1. For example, the process 1200 may be implemented as one or more sets of instructions and stored in database 140 and/or storage 220, and called and/or executed by processor 210.

In step 1210, processor 210 may determine whether the matching degree between the preliminary route and the existing route is larger than the first threshold. The existing route may be stored in storage 220, a server of a public transportation service provider, a server of a map service provider, etc.

When the matching degree between the preliminary route and the existing route is larger than the first threshold, in step 1220, processor 210 may delete the preliminary route. If there is a high matching degree between the preliminary route and the existing route, the preliminary route may bring competition to the existing route. Or the preliminary route may be unable to provide service to passengers located away from the existing route.

It should be noted that processor 210 may determine the matching degree based on one or more rules. The rules will be described hereinafter.

Figure 13:
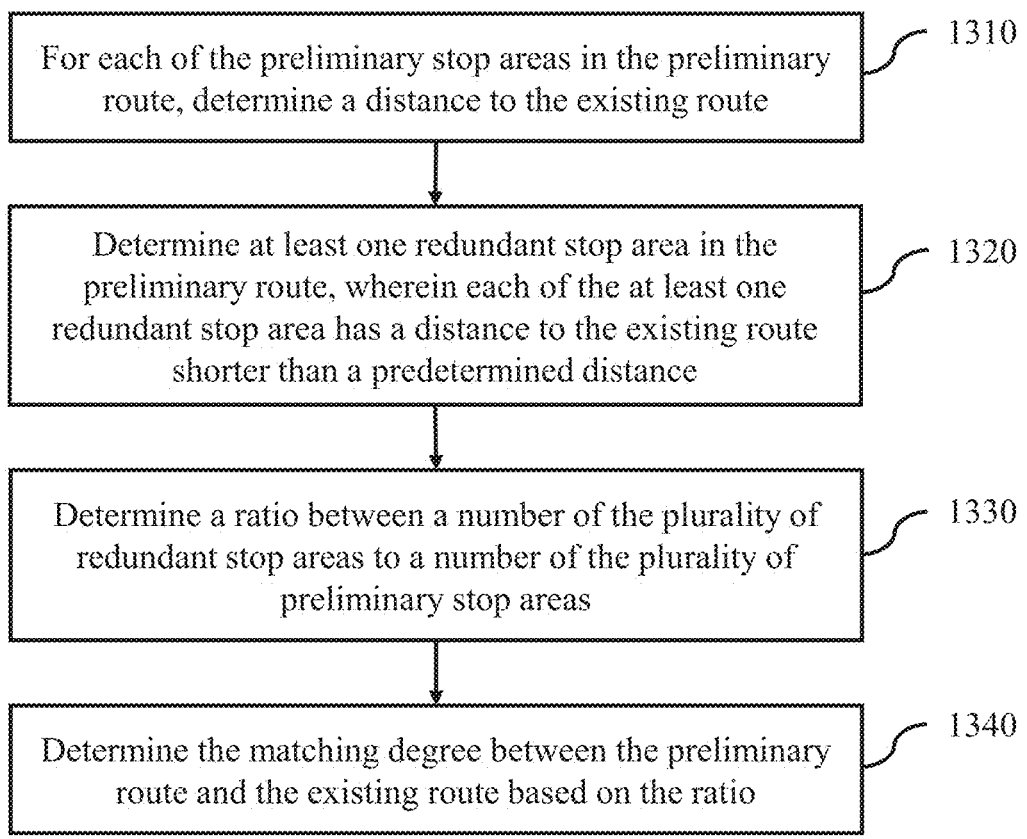
FIG. 13 shows an exemplary process for determining the matching degree between a preliminary route and an existing route according to some embodiments of the present disclosure.

FIG. 13 shows an exemplary process 1300 for determining the matching degree between a preliminary route and an existing route. In some embodiments, the process 1300 may be implemented in the transportation system 100 as illustrated in FIG. 1. For example, the process 1300 may be implemented as one or more sets of instructions and stored in database 140 and/or storage 220, and called and/or executed by processor 210.

In step 1310, for each of the preliminary stop areas in the preliminary route, processor 210 may determine a distance to the existing route. In some embodiments, each preliminary stop area may have a corresponding point in the existing route. The distance of a preliminary stop area to the existing route may be a distance between the preliminary stop area to its corresponding point in the existing route.

Processor 210, or any other processor may determine a curve fitting the existing route. For each of the preliminary stop areas in the preliminary route, processor 210 may find a foot of a perpendicular in the curve fitting the existing route. Processor 210 may determine the foot of the perpendicular as the corresponding point in the existing route. Alternatively, if processor 210 finds no foot of the perpendicular in the curve fitting the existing route, processor 210 may find an end that is close to the foot of the perpendicular. Processor 210 determine the end as the corresponding point in the existing route.

In step 1320, processor 210 may determine at least one redundant stop area in the preliminary route, wherein each of the at least one redundant stop area has a distance to the existing route shorter than a predetermined distance.

In step 1330, processor 210 may determine a ratio between a number of the plurality of redundant stop areas to a number of the plurality of preliminary stop areas.

In step 1340, processor 210 may determine the matching degree between the preliminary route and the existing route based on the ratio. In some embodiments, processor 210 may simply set the matching degree as the ratio. Processor 210 may determine the matching degree according to any rule, equation, or mathematical function.

For example, the predetermined distance may be 300 meters. A preliminary route $R_1$ has 10 preliminary stop areas. The redundant stop areas in the preliminary route $R_1$ may have a distance shorter than 300 meters to one of existing stop areas in an existing route $R_e$. Accordingly, processor 210 may determine and/or find that the preliminary route $R_1$ has 8 redundant stop areas. The ratio between the number of redundant stop areas to the number of preliminary stop areas are 0.8 (8/10). Processor 210 may set the matching degree between the preliminary route $R_1$ and the existing route $R_e$ as 0.8.

As another example, the predetermined distance may be 300 meters. A preliminary route $R_2$ has 15 preliminary stop areas. The redundant stop areas in the preliminary route $R_2$ may have a distance shorter than 300 meters to one of existing stop areas in an existing route $R_e$. The processor 210 may determine and/or find that the preliminary route $R_2$ has 9 redundant stop areas. The ratio between the number of redundant stop areas to the number of preliminary stop areas are 0.6 (9/15). Processor 210 may determine the matching degree as the square root of the ration, i.e., $\sqrt{0.6} = 0.78$.

It should be noted that the description above is just for illustrative purpose. The predetermined distance may be set according to the road condition, a size of a geographical area encompassing the preliminary route and the existing route, etc.

In some embodiments, the preliminary route and the existing route may be marked differently (in different colors, in different line weight, in different types of lines, or in different opacity, etc.) in a map interface.

Processor 210 may determine whether the preliminary route matches the existing route based on a plurality of distances between preliminary stop areas in the preliminary route and existing stop areas in the existing route.

FIG. 14 shows an exemplary process 1400 for determining whether the preliminary route matches the existing route. In some embodiments, the process 1400 may be implemented in the transportation system 100 as illustrated in FIG. 1. For example, the process 1400 may be implemented as one or more sets of instructions and stored in database 140 and/or storage 220, and called and/or executed by processor 210.

In step 1410, processor 210 may determine a plurality of distances. Each distance of the plurality of distance may be a distance between one of a plurality of preliminary stop areas in a preliminary route and one of a plurality of existing stop areas in an existing route.

In step 1420, processor 210 may determine whether the preliminary route matches the existing route based on the plurality of distances.

Additionally or alternatively, for each of at least one preliminary route, processor 210 may determine whether the preliminary route matches the existing route according to the process 1500 as shown in FIG. 15.

FIG. 15 shows an exemplary process 1500 for determining whether the preliminary route matches the existing route. In some embodiments, the process 1500 may be implemented in the transportation system 100 as illustrated in FIG. 1. For example, the process 1500 may be implemented as one or more sets of instructions and stored in database 140 and/or storage 220, and called and/or executed by processor 210.

In step 1510, processor 210 may determine a plurality of distances. Each distance of the plurality of distance may be a distance between one of a plurality of preliminary stop areas in a preliminary route and one of a plurality of existing stop areas in an existing route.

In some embodiments, the plurality of distances may be represented by a matrix. The number of preliminary stop areas in the preliminary route is A. The number of existing stop areas in the existing route is B. The matrix may have A rows and B columns. The matrix may be denoted as $M_{A \times B}$. The elements in the ith of $M_{A \times B}$ may be the distances between the ith preliminary stop area in the preliminary route to the existing stop areas in the existing route. The preliminary stop areas and the existing stop areas may be represented by their coordinates (longitudinal and latitudinal). Processor 210 may determine the distances based on their coordinates. In some embodiments, the coordinates of the preliminary stop areas may be from a first source. The coordinates of the existing stop areas may be from a second source other than the first source.

For example, a preliminary route may have three stop areas $a_1$, $a_2$, and $a_3$. An existing route may have three stop areas $b_1$, $b_2$, and $b_3$. The coordinates of $a_1$, $a_2$, and $a_3$ may be stored in storage 220, a server of a first map service provider. The coordinates of $b_1$, $b_2$, and $b_3$ may be stored in storage 220, a server of a second map service provider. Processor 210 may determine the distances between a preliminary stop area and an existing stop area. To be more specific, the distance between $a_1$ and $b_1$ may be denoted as $I_{11}$. Thus processor 210 may determine a matrix $M_{3 \times 3}$ as the following equation (1):

$$M_{3 \times 3} = \begin{bmatrix} l_{11} & l_{12} & l_{13} \\ l_{21} & l_{22} & l_{23} \\ l_{31} & l_{31} & l_{31} \end{bmatrix} \quad (1)$$

It should be noted that the description above is just for the purpose of illustration. In real scenario, the number of preliminary stop areas and the number of existing stop areas may be any other positive integer, rather than three (3). The number of preliminary stop areas may be unequal to the number of existing stop areas. For example, the existing route may have four (4) stop areas, while the preliminary route may have three (3) stop areas. Processor 210 may generate a matrix with four (4) rows and three (3) columns.

In step 1520, processor 210 may determine a vector $V_a$ and a vector $V_b$ based on the plurality of distances.

In some embodiments, for each and every row in the matrix $M_{A \times B}$, processor 210 may determine a minimum value of the row. $V_a$ may be a vector of A elements. The ith element of $V_a$ may be the minimal element of the ith row in the matrix $M_{A \times B}$. For each and every column in the matrix $M_{A \times B}$, processor 210 may determine a minimum value of the column. Vb may be a vector of B elements. The jth element of $V_b$ may be the minimal element of the jth column in the matrix $M_{A \times B}$.

For example, the MAxB may be as following:

$$M_{3 \times 3} = \begin{bmatrix} l_{11} & l_{12} & l_{13} \\ l_{21} & l_{22} & l_{23} \\ l_{31} & l_{32} & l_{33} \end{bmatrix} = \begin{bmatrix} 50 & 100 & 80 \\ 40 & 60 & 75 \\ 90 & 30 & 100 \end{bmatrix} \quad (2)$$

Processor 210 may determine the vectors $V_a$ and $V_b$ are as following:

$$V_a = (50,40,30) = (l_{11}, l_{21}, l_{32}) \quad (3)$$

$$V_b = (40,30,75) = (l_{21}, l_{32}, l_{23}) \quad (4)$$

In step 1530, processor 210 may determine whether the existing route matches the preliminary route based on the vectors $V_a$ and $V_b$. In some embodiments, the determination may be based on a predetermined rule.

The predetermined rule may include at least one of the following rules:

Rule 1: If a ratio between a number of elements in the vector $V_a$ that is larger than a first distance threshold to a total number of elements in the vector $V_a$ is larger than a first ratio, processor 210 will determine that preliminary route does not match the existing route.

According to the equation (3), if the first distance is 40 meters and the first ratio is 1/3, the number of elements in the vector $V_a$ that is larger than 40 meters is 1. The ratio between the number of elements in the vector $V_a$ that is larger than 50 meters to the total number of elements in the vector $V_a$ (3) is 1/3. The ratio is not larger than the first ratio. Processor 210 may determine the preliminary route match the existing route.

Rule 2: If a ratio between a number of elements in the vector Vb that is larger than a second distance threshold to a total number of elements in the vector Vb is larger than a second ratio, processor 210 will determine that preliminary route does not match the existing route.

According to the equation (4), if the second distance is 60 meters and the second ratio is 1/3, the number of elements in the vector $V_b$ that is larger than 60 meters is 1. The ratio between the number of elements in the vector $V_b$ that is larger than 60 meters to the total number of elements in the vector $V_b$ (3) is 1/3. The ratio is not larger than the second ratio. Processor 210 may determine the preliminary route match the existing route.

It should be noted that elements in the matrix $M_{A \times B}$, the vectors $V_a$, and $V_b$ have dimensions of distances. They may have a common unit, such as, meter, kilometer, foot, or mile.

In some embodiments, each element in the vector $V_a$ may be represented by an index. The index may include a row number and a column number of the element in the original matrix $M_{A \times B}$. The column numbers of elements in the vector $V_a$ may form a sequence.

Rule 3: If the sequence associated with the vector $V_a$ is not monotonously increasing, processor 210 will determine that preliminary route does not match the existing route.

According to the equation (2), the sequence associated with the vector $V_a$ is (1, 1, 2). The sequence is monotonously increasing. Processor 210 may determine the preliminary route matches the existing route.

It should be noted that a monotonously increasing sequence may have two or more adjacent elements being equal to each other.

In some embodiments, each element in the vector $V_b$ may be represented by an index. The index may include a row number and a column number of the element in the original matrix $M_{A \times B}$. The row numbers of elements in the vector $V_b$ may form a sequence.

Rule 4: If the sequence associated with the vector $V_b$ is not monotonously increasing, processor 210 will determine that preliminary route does not match the existing route.

According to the equation (3), the sequence associated with the vector $V_b$ is (2, 3, 2). The sequence is not monotonously increasing. Processor 210 may determine the preliminary route does not match the existing route.

It should be noted that processor 210 may use the rules described above in combination or independently. Processor 210 may determine that the preliminary route does not match the existing route if one of the four rules are met. Alternatively, processor 210 may determine that the preliminary route dose not match the existing route if any combination of the four rules is met. In some embodiments, processor 210 may determine that the preliminary route does not match the existing route if all of the four rules are met. Processor 210 may conduct the determination according to the four rules in any order, for example, in series or in parallel.

It should be noted that the first distance and the second distance are distance thresholds that may be designated to any value according to the real scenario. The first distance may be equal to, or different from the second distance.

It should be noted that the first ratio and the second ratio are ratio thresholds that may be designated to any value according to the real scenario. The first ratio may be equal to, or different from the second ratio.

In some embodiments, processor 210 may select an existing route from a list of existing routes to determine whether the selected existing route matches the preliminary route. Processor 210 may select the existing route based on a filtering rule. If one or more properties associated with an existing route meet the filtering rule, processor 210 may select the existing route and determine whether the selected existing route matches the preliminary route. The filtering rule may reduce the consumption of computing power for processor 210.

In some embodiments, the filtering rule may include:

A distance between a centroid associated with an existing route and a centroid associated with the preliminary route is less than a third distance.

In some embodiments, a centroid for a route may be a centroid of a polygon. The polygon may have multiple vertex. Each of the multiple vertex may correspond to a stop area of the route.

For example, if an existing route has ten stop areas, the polygon circled by the existing route may be a decagon. The centroid may have a coordinate. The coordinate of the centroid may be an average of coordinates of the ten vertices (ten stop areas). The latitude of the centroid may be an average of latitudes of the ten vertices. The latitude of the centroid may be an average of latitudes of the ten vertices. The longitude of the centroid may be an average of longitudes of the ten vertices.

Alternatively, the centroid for a route may be a center of two ends of the route. The two ends may include a starting stop area and an end stop area of the route.

Processor 210 may determine a centroid for an existing route in advance. The centroid for the existing route may be stored and accessed when processor 210 needs to determine whether processor 210 needs to determine the match between the preliminary route and the existing route.

It should be noted that a centroid of a route may have any definition other than the two definitions described above. The third distance may be determined based on the total length of the preliminary route, the total length of the existing route, the scope of the geographical area encompassing the preliminary route, etc.

Processor 210 may determine one or more premium routes among the generated preliminary route(s). The premium routes may be of economical, demographical, or transportation importance. The premium routes may have a priority over other preliminary routes. In some scenarios, a transportation service provider may prioritize planning, construction, or operation of a premium route among its projected preliminary routes.

To determine the premium routes, processor 210 may further evaluate the determined preliminary routes. The evaluation may be relating to a profit, a benefit, or convenience of the preliminary route. The evaluation may be based on a score determined by processor 210. The score may indicate a level of profit, benefit, or convenience. Processor 210 may conduct the evaluation automatically, after it determine the preliminary routes.

Figure 16:
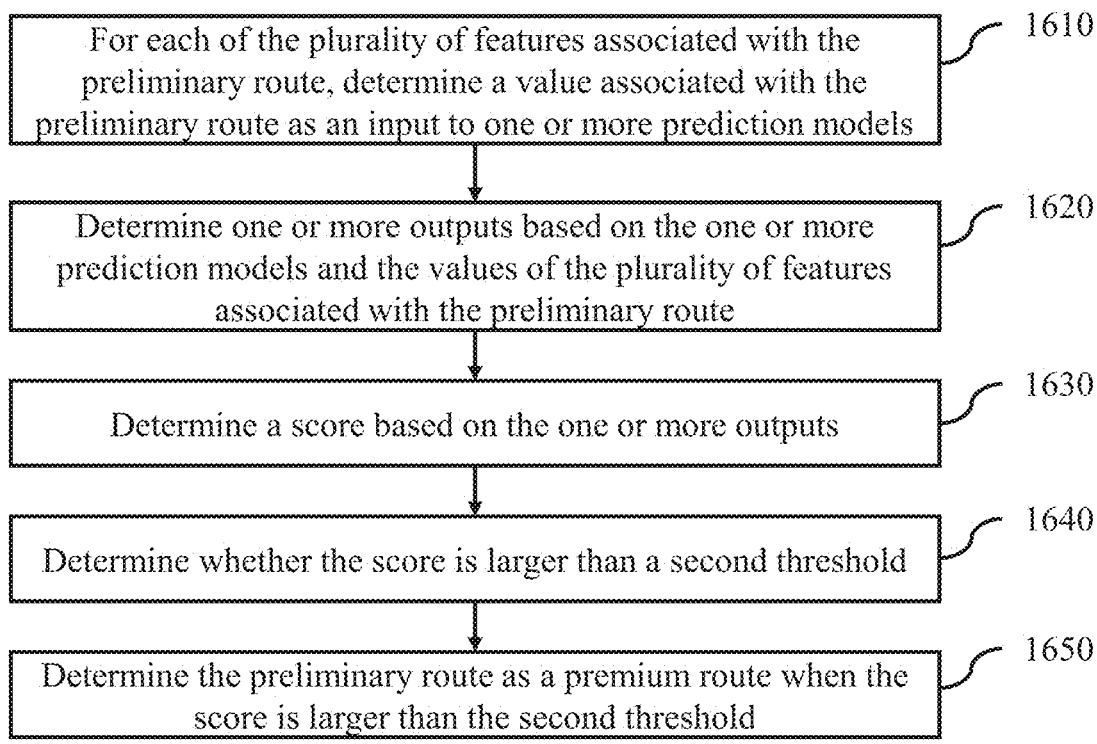
FIG. 16 shows an exemplary process for determining a candidate premium route according to some embodiments of the present disclosure.

FIG. 16 shows an exemplary process 1600 for determining a premium route. The process 1600 may be implemented in the transportation system 100 as illustrated in FIG. 1. For example, the process 1600 may be implemented as one or more sets of instructions and stored in database 140 and/or storage 220, and called and/or executed by processor 210.

In step 1610, for each of the plurality of features associated with the preliminary route, processor 210 may determine a value associated with the preliminary route as an input to the one or more prediction models for each of the plurality of features associated with the preliminary routes.

The one or more prediction models may take the features described above as inputs and output a score associated with the preliminary route. The prediction models may include a classifier model, a decision forest, a neural network, a perceptron model, etc. In some embodiments, different prediction models may be determined or established according to different rules. The different models may be independent and linear uncorrelated.

When the prediction model is a decision forest, the decision forest may include multiple decision tree models. Each of the multiple decision tree models may be determined randomly based on a decision forest. A decision tree model may take one or more features associated with the preliminary route as inputs and output an evaluation result. After the constituent decision tree models of the decision forest generate their evaluation results, the decision forest may average or conduct a vote between the evaluation results. The number of decision tree models may be preset or adjusted according to the computing power of the processor 210, the computing task, or other factors. It should be noted that the decision tree model may be also a classifier. The classifier's output may be determined by processor 210 as the score.

The prediction models may be determined by a processor 210, such as processor 210 or any other processor, using a machine learning method. The machine learning method may train the prediction models using evaluations for one or more existing routes or historical routes as desired outputs. The existing routes or historical routes may constitute a training set. The existing routes or historical routes may be a bus line, a subway line, or a ferry line, etc. Some of the existing routes or historical routes may be manually marked as being commercially profiting, beneficial, convenient, or the like. Some of the existing routes or historical routes may be manually marked as being commercially profitless, non-beneficial, inconvenient, or the like. The marking may be based on statistics or feedback for the existing route or the historical route. Further, each of the existing routes or historical routes may be assigned a score. For each route, the score may indicate a level of profit, benefits, or convenience. The training may be an iterative process. The processor 210 may train the decision tree models using features corresponding to the marked existing routes or historical routes as inputs. The processor 210 may determine the scores of the marked existing routes or historical routes as desired outputs of the decision models. After the iterative training, each of the decision tree models may reach its steady state, i.e., it may change only negligibly after further training. When a decision tree model reaches its steady state, the decision tree model may be accurate to describe correlations between one or more features and the score of the preliminary route.

Processor 210 may select one or more features randomly from a set of features to train the decision tree models. The selected one or more features may be determined by the processor 210 as input(s) to the decision tree models.

In step 1620, processor 210 may determine one or more outputs based on the one or more prediction models and the values of the plurality of features associated with the preliminary route. Each of the one or more outputs may correspond to one prediction model.

In step 1630, processor 210 may determine a score based on the one or more outputs. When there is only one output, processor 210 may directly determine the output as the score. In some embodiments, when there are multiple prediction models and multiple outputs, processor 210 may average the multiple outputs or apply weighting factors to the multiple outputs. Alternatively, processor 210 may apply a function to the multiple output and generate a value. Processor 210 may determine the generated value as the score.

In some embodiments, processor 210 may use multiple decision tree models in the decision forest to evaluate the score associated with a preliminary route. The multiple decision models may output multiple scores. Processor 210 may determine a final score according to the decision tree.

In step 1640, processor 210 may determine whether the score associated with the preliminary route is larger than a second threshold.

The second threshold may be set manually or adaptively according to real scenario. It should be noted that the second threshold may be determined according to statistics of existing routes that are commercially profiting, of significance to the general public, etc.

In step 1650, processor 210 may determine the preliminary route as the premium route when the score associated with the preliminary route is larger than the second threshold.

Figure 17:
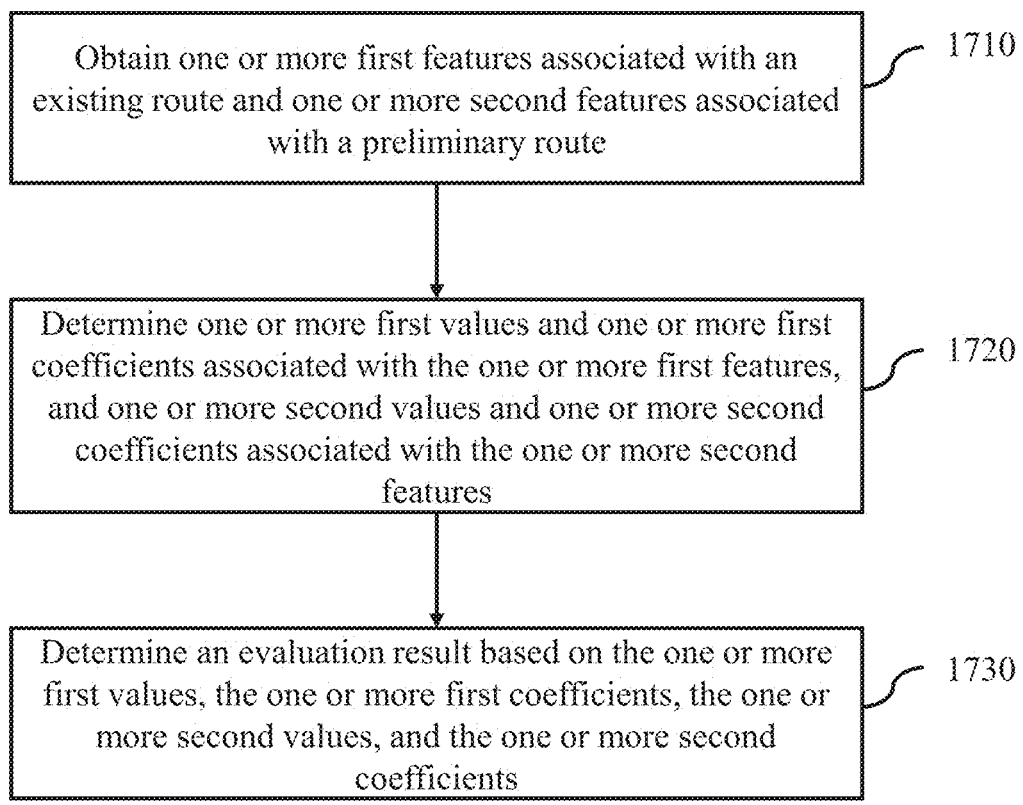
FIG. 17 shows an exemplary process for determining a score associated with a preliminary route using a prediction model according to some embodiments of the present disclosure.

In some embodiments, processor 210 may determine an evaluation result associated with a preliminary route according to a process 1700 shown in FIG. 17. The evaluation result may be based on a first feature associated with an existing route and a second feature associated with the preliminary route.

FIG. 17 shows an exemplary process 1700 for determining a score associated with a preliminary route using a prediction model. The process 1700 may be implemented in the transportation system 100 as illustrated in FIG. 1. For example, the process 1700 may be implemented as one or more sets of instructions and stored in database 140 and/or storage 220, and called and/or executed by processor 210.

Processor 210 may obtain one or more first eatures associated with an existing route and one or more second features associated with a preliminary route in step 1710.

In step 1720, processor 210 may determine one or more first values and one or more first coefficients associated with the one or more first features, and one or more second values and one or more second coefficients associated with the one or more second features.

In step 1730, processor 210 may determine an evaluation result based on the one or more first values, the one or more first coefficients, the one or more second values, and the one or more second coefficients. The evaluation result may be presented as a value. The value of evaluation result may indicate whether preliminary route has an overall advantage over the existing route. Processor 210 may multiply each of the one or more second values by the corresponding second coefficient and generate a product. Processor 210 may determine a sum of the products of the one or more second values and their corresponding second coefficients. Processor 210 may determine the sum as the evaluation result.

The first features may include a number of transfers when a passenger chooses the existing route, a duration for the passenger to travel along the existing route, or a total distance of walking when the passenger chooses the existing route. The existing route may include one or more segments. The passenger may take one kind of transportation vehicles along each of the segments. At least one transfers may be needed between one segment and another segment. For example, a passenger may travel from his home $A_0$ to a subway station $A_3$. The passenger may need to walk from his home $A_0$ to a bus stop $A_1$. Then he may take a bus at the bus stop $A_1$ and get off at a bus stop $A_2$, which may be also a subway station. At last he may take a subway train at subway station $A_2$ and get off at the subway station $A_3$. Thus the number of transfers is two (2).

In some scenarios, a passenger choosing a preliminary route may have less transfers than another passenger choosing an existing route of a public transportation service. In some scenarios, the preliminary route may have no transfer. Thus the existing route may be seemed as less convenient than the preliminary route in the eyes of the passenger. Thus the preliminary route may have an advantage over the existing route having a large number of transfers. For example, if the existing route from a residential district A to an office building B has three (3) transfers, the coefficient for the number of transfers may be positive, say two (2). It should be noted that the above description is just for illustrative purposes, and the first coefficient may be set according to the scenario.

The second features may include a total distance of the preliminary route, a duration for taking a vehicle driving along the preliminary route, or a fare paid by the passenger for choosing the preliminary route.

In some embodiments, when the second features include a total distance of the preliminary route, the second value and/or the second coefficient for the total distance may be set according to whether the total distance is within a predetermined range. When the total distance is within a predetermined range, the second value for the total distance may be 1. The second coefficient for the total distance may be positive. When the total distance is not within the predetermined range, the second value for the total distance may be 1. The second coefficient for the total distance may be non-positive. The predetermined range may be set according to the profiting of the preliminary route. When the preliminary route has a total distance within the predetermined range, it may be more profitable or more likely to profit to operate a public transportation service along the preliminary route. For example, the predetermined range may be a range from 13 kilometers to 50 kilometers. If a preliminary route from a location A to a location B has a total distance of 40 kilometers, then the second value for the total distance may be one (1). The second coefficient may be one (1). If a preliminary route from a location C to a location D has a total distance of 60 kilometers, then the second value for the total distance may be one (1). The second coefficient may be minus ten (−10). It should be noted that the above description is just for illustrative purposes, and the value and/or coefficient may be set according to the scenario.

In some embodiments, the second features may include a duration relating to the preliminary route. The duration may be a duration for a passenger to travel from a stop area to another stop area along the preliminary route. Generally, passengers may tend to choose a travel plan with a low time cost. If a travel plan of choosing a transportation service along a preliminary route consumes less time compared to a travel of choosing one or more transportation services along an existing route, passengers may be more likely to choose the transportation service along the preliminary route. The preliminary route may have advantage over the existing route. For example, it may take 1 hour to travel from location A to location B by taking a vehicle along a preliminary route. As comparison, it may take 1.5 hours to travel from location A to location B by taking one or more vehicles along an existing route. Processor 210 may determine a difference between the duration of time of the preliminary route and the duration of time of the existing route as a second feature associated with the preliminary route. Processor 210 may determine the difference in the duration of time, i.e., 0.5 hour, as a value of the second feature. If a coefficient for the difference in the duration of time is a non-positive value, say, −6, processor 210 may determine a product to be 0.5×−6=−3. It should be noted that the above description is just for illustrative purposes, and the coefficient may be set according to the scenario.

In some embodiments, the second features may include a fare relating to the preliminary route. A passenger may be charged by a provider of public transportation service for travelling from a stop area to another stop area along the preliminary route. The provider may provide a list of fares to the public. A fare between one stop area and another stop area may be determined according to the list. Generally, passengers may tend to choose a travel plan with a low monetary cost. If a travel of choosing a transportation service along a preliminary route consumes less money compared to a travel of choosing one or more transportation services along an existing route, passengers may be more likely to choose the transportation service along the preliminary route. When the fare associated with the preliminary route is lower than the fare associated with the existing route, the second value for the fare may be 1. The second coefficient for the fare may be positive. When the fare associated with the preliminary route is higher than the fare associated with the existing route, the second value for the fare may be 1. The second coefficient for the fare may be non-positive. Processor 210 may determine a difference between the fare associated with the preliminary route and the fare associated with the existing route. For example, it may take 16 dollars to travel from location A to location B by taking a vehicle along a preliminary route. As comparison, it may take 9 dollars to travel from location A to location B by taking one or more vehicles along an existing route. Processor 210 may determine a difference between the fare associated with the preliminary route and the fare associated with the existing route as 7. Processor 210 may determine a value of the second feature as 1. If a coefficient for the difference in the fare is a non-positive value, say, 0, processor 210 may determine a product to be 7×0=0. It should be noted that the above description is just for illustrative purposes, and the coefficient may be set according to the scenario.

In some embodiments, the second features may include a distance of walking relating to the existing route and/or preliminary route. The distance of walking may be a sum of one or more distances for one or more segments. The passenger may be required to walk for the one or more segments. A passenger may need to walk to a stop area to get on a vehicle of the public transportation along the preliminary route. When the passenger gets off the vehicle at another stop area, he/she may also need to walk to his/her destination. Generally, passengers may tend to choose a travel plan with a short distance of walking. If a travel of choosing a transportation service along a preliminary route requires a shorter distance of walking compared to a travel of choosing one or more transportation services along an existing route, passengers may be more likely to choose the transportation service along the preliminary route. The preliminary route may have advantage over the existing route. When the distance of walking associated with the preliminary route is larger than a predetermined distance, the second value for the distance of walking may be 1. The second coefficient for the distance of walking may be positive. When the distance of walking associated with the preliminary route is smaller than the distance of walking associated with the existing route, the second value for the distance of walking may be 1. The second coefficient for the distance of walking may be non-positive. The predetermined distance may be set manually or adaptively according to the total length of the preliminary route, or other factors. For example, the predetermined distance may be 1.5 kilometers. It may be acceptable for passengers to walk for a distance within 1.5 kilometers. If a distance of walking exceeds 1.5 kilometers, passengers may be more likely to take a transportation service. For example, the distance of walking from location A to location B is 1.3 kilometers. That distance is shorter than the predetermined distance of 1.5 kilometers. Processor 210 may determine a value associated with the second feature as 1. If a coefficient for the difference in the fare is a non-positive value, say, 0, processor 210 may determine a product to be 1×0=0. It should be noted that the above description is just for illustrative purposes, and the value and/or coefficient may be set according to the scenario.

In some embodiments, the first coefficients associated with the one or more first features may be positive. For example, the coefficient corresponding to the number of transfers may be positive.

For example, there may be only two features for a preliminary route. Each feature corresponds to a second value. One second value A equals to 2 and its corresponding coefficient a equals to 1. The other second value B equals to 3 and its corresponding coefficient b equals to 2. Processor 210 may determine the evaluation result as A×a+B×b=2×1+3×2=8.

In some embodiments, the second feature may include a combination the features described above. Take the following description as an example. There are two locations A and B. An existing route and a newly planned preliminary route are currently operated. A passenger has to take one (1) transfer when he/she chooses an existing route of a public transportation service. The coefficient for the number of transfer is 2. As an alternative, the passenger may choose the preliminary route. The total length of the preliminary route is 20 kilometers. The total length is shorter than a predetermined length of 50 kilometers. Thus the coefficient for the total length of the preliminary route is 1. Travelling along the existing route takes 50 minutes and a fare of 7 dollars. Travelling along the preliminary route takes 30 minutes and a fare of 8 dollars. The difference between the duration associated with the preliminary route and the duration associated with the existing route is −20 minutes. Thus the value for the duration of time is −20 minutes. The coefficient for the duration of time is −0.1. The difference between the fare associated with the preliminary route and the fare associated with the existing route is 1 dollar, larger than 0. Thus the value for the fare is 1. The coefficient of the fare is 0. The preliminary route requires a walking distance of 1 kilometer. The walking distance is within a predetermined distance of 1.5 kilometers. Thus the value for the walking distance is 1. The coefficient for the walking distance is 0. Table 1 shows a list of features, their respective values, and their respective coefficients.

TABLE 1

| Feature | Existing route | Preliminary route | Reference | Value | Coefficient |
|---|---|---|---|---|---|
| No. of transfers | 1 | 0 | — | 1 | 2 |
| Total length/km | — | 20 | 50 | 1 | 1 |
| Duration/min. | 50 | 30 | — | −20 | −0.1 |
| Fare/dollar | 7 | 8 | — | 1 | 0 |
| Walking distance/km | 1.0 | — | 1.5 | 1 | 0 |

Processor 210 may determine the evaluation result as 1×2+1×1+(−20)×(−0.1)+1×0+1×0=5. The positive evaluation result may indicate that the preliminary route have an overall advantage over the existing route.

Further, in some embodiments, when there are at least two preliminary routes, processor 210 may determine an evaluation result for each of the at least two preliminary routes. Processor 210 may determine a ranking of the preliminary routes according to the values of evaluation results. Processor 210 may determine one or more preliminary routes with larger value of the evaluation results as a premium route. The premium route may have a priority over other preliminary routes.

Figure 18:
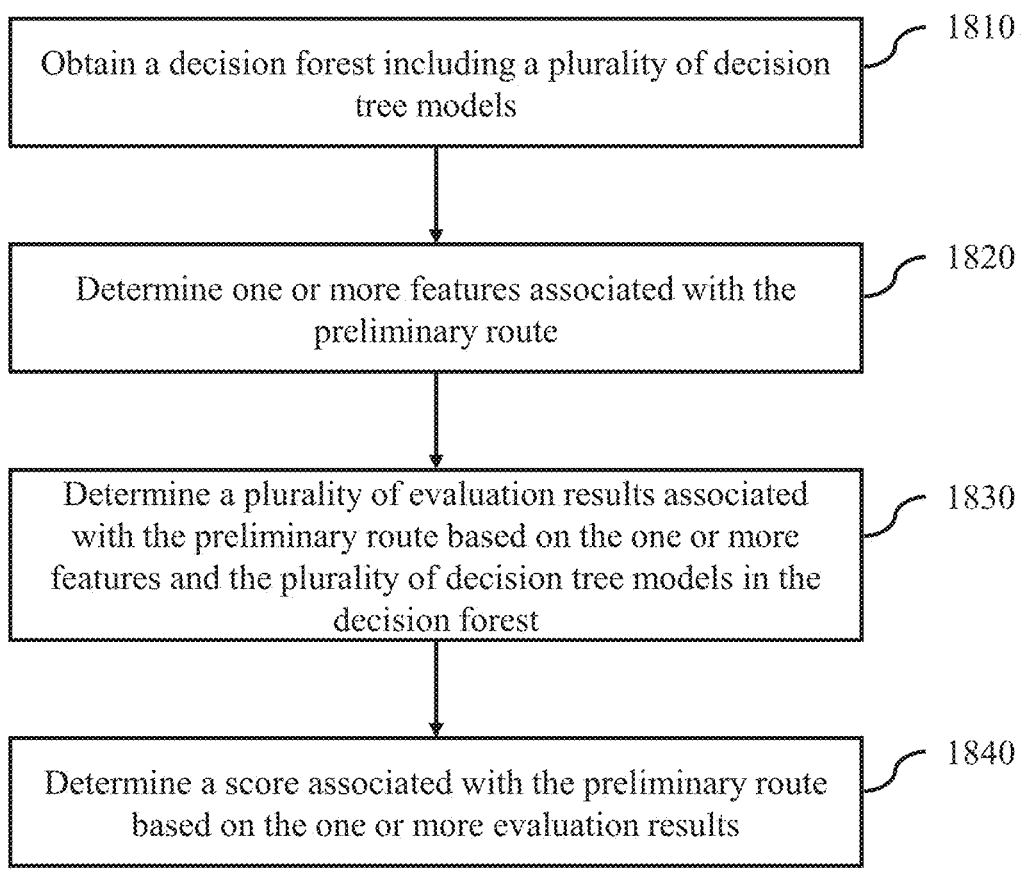
FIG. 18 shows an exemplary process for determining a score associated with a preliminary route using a decision forest according to some embodiments of the present disclosure.

FIG. 18 shows an exemplary process 1800 for determining a score associated with a preliminary route using a decision forest. In some embodiments, the process 1800 may be implemented in the transportation system 100 as illustrated in FIG. 1. For example, the process 1800 may be implemented as one or more sets of instructions and stored in database 140 and/or storage 220, and called and/or executed by processor 210. In some embodiments, once the decision forest is established, processor 210 may determine the score of the preliminary route automatically.

Processor 210 may obtain a decision forest including a plurality of decision tree models in step 1810. The plurality of decision tree models may be independent, or uncorrelated to each other.

In step 1820, processor 210 may determine one or more features associated with the preliminary route. The one or more features may include at least one of a total length of the preliminary route, an estimated driving duration of the preliminary route, charge information relating to the preliminary route, or a number of a plurality of passengers served by the preliminary route.

In step 1830, processor 210 may determine a plurality of evaluation results associated with the preliminary route based on the one or more features and the plurality of decision tree models in the decision forest.

In step 1840, processor 210 may determine a score associated with the preliminary route based on the plurality of evaluation results. Processor 210 may conduct a vote among the one or more evaluation results. Processor 210 may determine a value of an evaluation result that wins the vote as the score associated with the preliminary route. The vote may be a majority vote (e.g., a 50-50 vote), a supermajority vote (e.g. a two thirds vote, a six tenths vote, etc.), etc. Alternatively, processor 210 may average the one or more evaluation results. Specifically, the averaging may be based on one or more weighting factors assigned to the one or more evaluation results.

For example, there is a preliminary route from Location A to Location B. Processor 210 uses a decision forest including six (6) decision tree models to evaluate the preliminary route. The six decision tree models output six (6) outputs. The outputs are 0.5, 0.6, 0.5, 0.6, 0.7, and 0.1. Processor 210 determines an average of the six outputs as 0.5. Processor 210 further determines that the score associated with the preliminary route from Location A to Location B is 0.5. The predetermined second threshold is 0.3. Processor 210 may determine the preliminary route from Location A to Location B as a premium route since the score is larger than the second threshold.

The description above is just for illustrative purpose. The number of decision tree models in the forest may be determined according to the size of the training set, the number of features, the computing power, the computing task, etc.

In some embodiments, processor 210 may filter or delete some of the multiple preliminary route according to certain principles. The principles may include an "one stop area, one route" principle. The "one stop area, one route" principle may require that there can only be one route passing through one certain stop area.

FIGS. 19-A through 19-D illustrate examples of preliminary routes between multiple preliminary stop areas A, B, C, D, E, and F.

In FIG. 19-A, for preliminary stop area A, there may be preliminary routes to B, C, and D. For preliminary stop area B, there may be a preliminary route to C. For preliminary stop area D, there may be preliminary routes to E and F. For preliminary stop area E, there may be a preliminary route to F.

If the preliminary route from A to B has a larger score than the preliminary route from A to C or the preliminary route from A to D, processor 210 may determine that the preliminary route from A to D and the preliminary route from A to E should be deleted. Also, if the preliminary route from D to F has a larger score than the preliminary route from D to E, processor 210 may delete the preliminary route from D to E. FIG. 19-B shows the preliminary routes after the preliminary routes from A to C, from A to D, and from D to E are deleted.

In FIG. 19-B, there are two preliminary routes passing through B. If the preliminary route from A to B has a larger score than the preliminary route from B to C. Processor 210 may delete the preliminary route from B to C. FIG. 19-C shows the preliminary routes after the preliminary routes from B to C is deleted.

In FIG. 19-C, there are two preliminary routes ending at F (the one from D to F and the other one from E to F). If the preliminary route from D to F has a larger score than the preliminary route from E to F. Processor 210 may delete the preliminary route from E to F according to the "one stop area, one route" principle. FIG. 19-D shows the preliminary routes after the preliminary routes from E to F is deleted.

Figure 20:
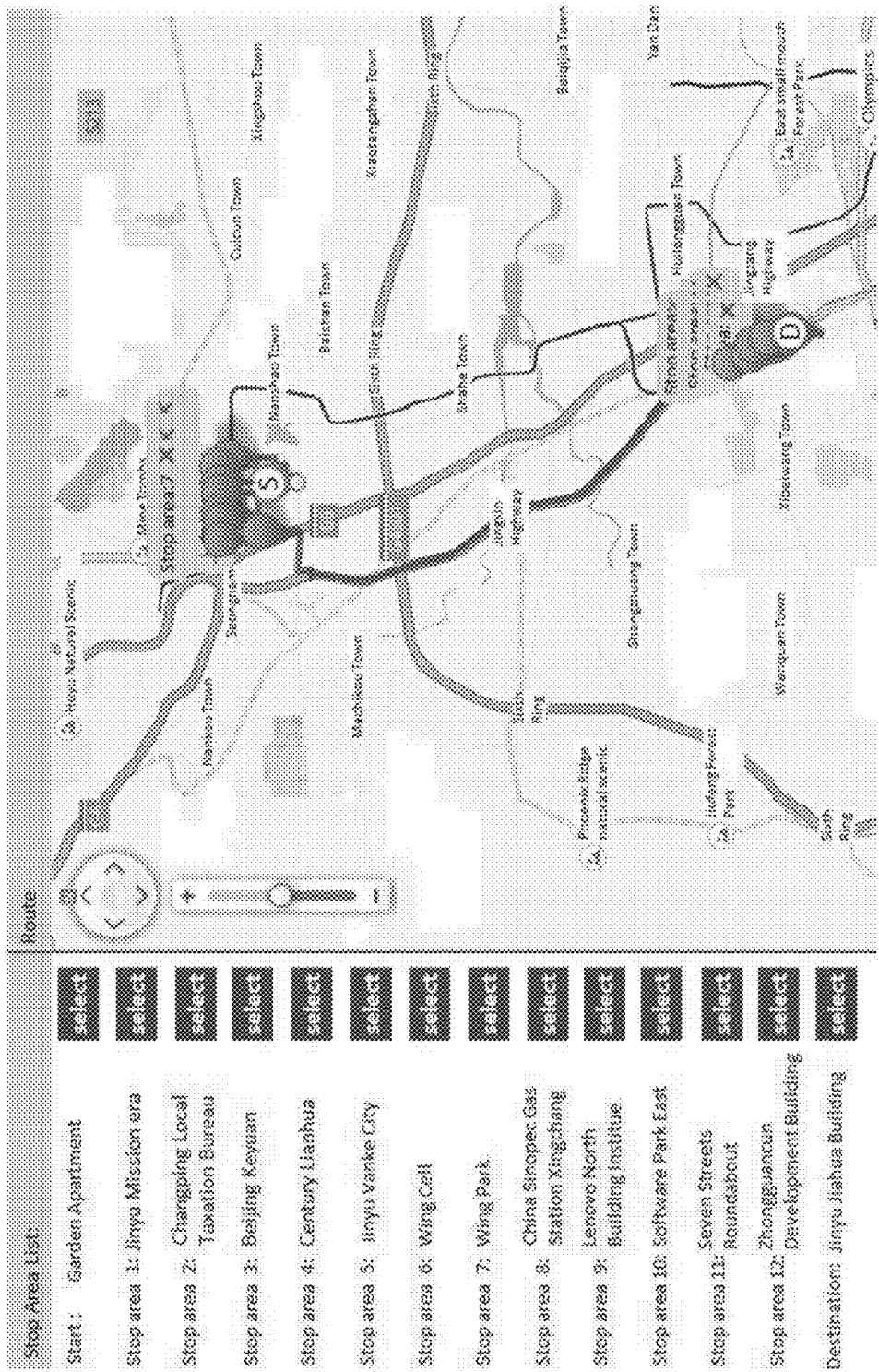
FIG. 20 shows an exemplary user interface showing multiple preliminary stop areas in an interactive map interface according to some embodiments of the present disclosure.

FIG. 20 shows an exemplary user interface showing multiple preliminary stop areas in an interactive map interface. The user interface may be displayed in a display of a passenger's computing device (for example, a mobile device, a computer, etc.).

Figure 21:
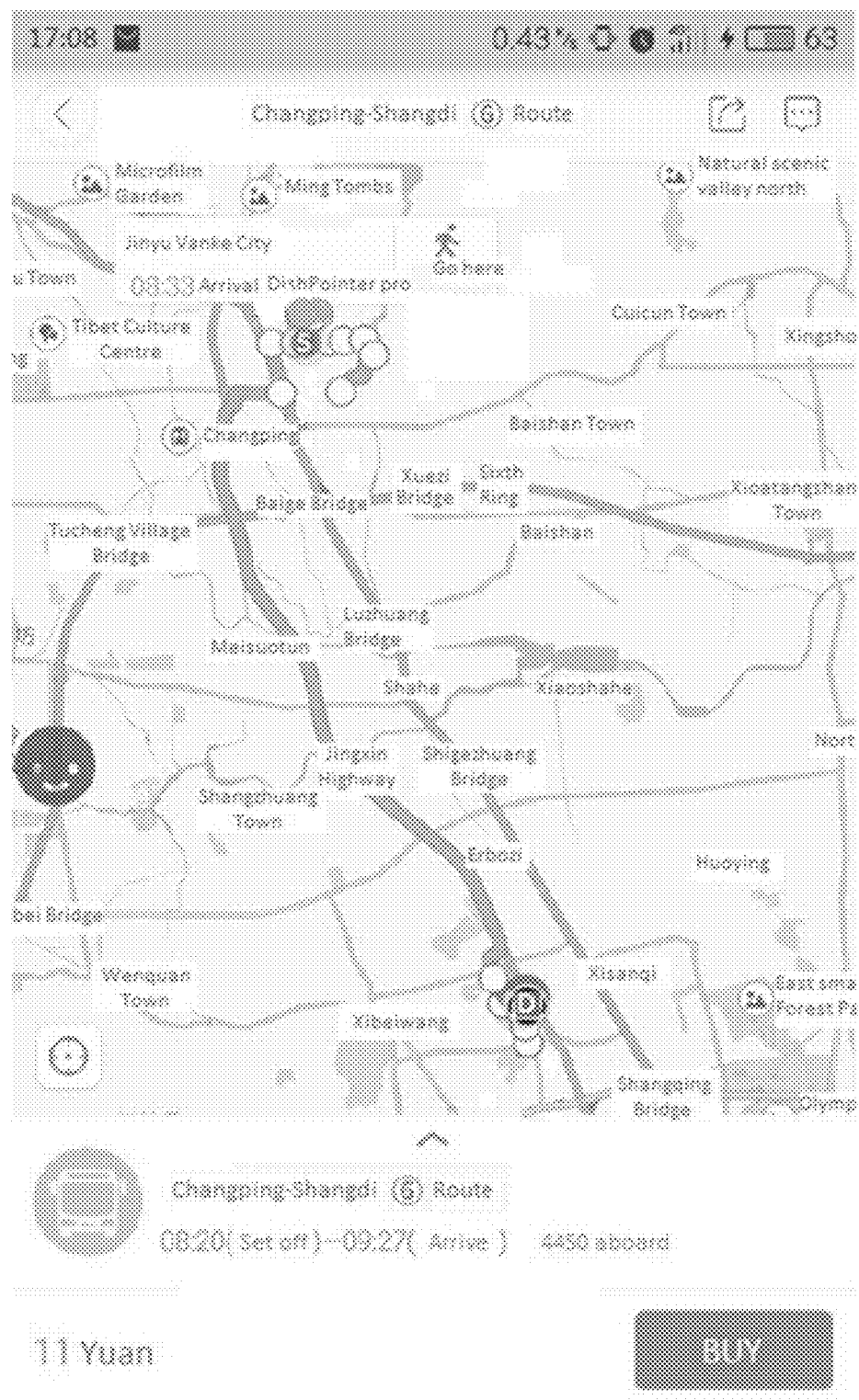
FIG. 21 shows another exemplary user interface showing multiple preliminary stop areas in an interactive map interface according to some embodiments of the present disclosure.

FIG. 21 shows another exemplary user interface showing multiple preliminary stop areas of a preliminary route in an interactive map interface. The user interface may include temporary information and charge information associated with the preliminary route. The temporary information may include a starting time and an estimated end time of a trip. The charge information may include one or more fares for one or more segments along the preliminary route. The user interface may be displayed in a display of a passenger's computing device (for example, a mobile device, a computer, etc.).

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device" or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

We claim:

1. A system configured to determine a route of a target transportation service of at least one of taxi hailing, chauffeur service, express car, carpool, bus service, driver hire and shuttle service, comprising:
   processors electronically connected to at least one non-transitory storage medium via a communication bus, wherein during operation, the processors load a set of instructions from the at least one storage medium to:
   obtain electronic signals from requestor terminals via the communication bus, the electronic signals including demand information of one or more transportation services from a plurality of passengers associated with the requestor terminals, the demand information of each of the plurality of passengers including a start and a destination encompassed in a geographical area;

access the at least one non-transitory storage medium via the communication bus and obtain a look-up table stored therein;

convert coordinates of the geographical area into a first character string with a predetermined length based on the look-up table to reduce consumption of resources;

divide the geographical area into a plurality of subareas, each subarea being represented by a second character string;

for each of the plurality of subareas,
determine a number of starts and destinations encompassed by the subarea;
determine whether the number of starts and destinations is more than a first threshold; and
when the number of starts and destinations is more than the first threshold, determine the subarea as a preliminary stop area of a plurality of preliminary stop areas;

determine at least one preliminary route passing through the plurality of preliminary stop areas;

send to and display the at least one preliminary route on user interfaces.

2. The system of claim 1, wherein the processors further:
obtain electronic signals from the communication bus, the electronic signals including records of a plurality of historical requests relating to the transportation service associated with the plurality of passengers;
obtain electronic signals from the communication bus, the electronic signals including real-time demands relating to the transportation service from the plurality of passengers; and
determine the demand information based on the records and the real-time demands.

3. The system of claim 1, wherein the processors further:
divide a geographical area encompassing the plurality of starts and the plurality of destinations into a plurality of subareas;
for each of the at least one preliminary route,
determine a matching degree between the preliminary route and an existing route;
determine whether the matching degree between the preliminary route and the existing route is larger than a first threshold; and
when the matching degree is smaller than the first threshold, determine the preliminary route as a candidate route.

4. The system of claim 3, wherein the plurality of preliminary stop areas comprises a first preliminary stop area and a second preliminary stop area and the processors further:
determine a first composite area encompassing the first preliminary stop area and a second composite area encompassing the second preliminary stop area;
determine an overlapping area shared by the first composite area and the second composite area; and
determine an expanded overlapping area encompassing the overlapping area based on:
a number of starts and destinations in the expanded overlapping area;
a number of starts and destinations in the first composite area; and
a number of starts and destinations in the second composite area.

5. The system of claim 4, wherein the processors further;
determine a sum of the number of starts and destinations in the first composite area and the number of starts and destinations in the second composite area;
determine a ratio between the number of starts and destinations in the composite overlapping area to the sum;
determine whether the ratio is larger than a predetermined ratio; and
when the ratio is larger than the predetermined ratio, determine the expanded overlapping area as a preliminary stop area.

6. The system of claim 1, wherein for each of the plurality of preliminary routes, the processors further:
for each of the at least one preliminary route,
determine whether the matching degree between the preliminary route and the existing route is larger than the first threshold; and
when the matching degree between the preliminary route and the existing route is larger than the first threshold, delete the preliminary route.

7. The system of claim 1, wherein for each of the at least one preliminary route, the processors further:
for each of the plurality of preliminary stop areas, determine a distance to the existing route;
determine at least one redundant stop area in the preliminary route, wherein each of the at least one redundant stop area has a distance to the existing route shorter than a predetermined distance;
determine a ratio between a number of the plurality of redundant stop areas to a number of the plurality of preliminary stop areas; and
determine the matching degree between the preliminary route and the existing route based on the ratio.

8. The system of claim 6, wherein for each of the at least one preliminary route, the processors further:
determine a plurality of distances, wherein each distance of the plurality of distance is a distance between one of a plurality of preliminary stop areas in a preliminary route and one of a plurality of existing stop areas in the existing route; and
determine whether the preliminary route matches the existing route based on the plurality of distances.

9. The system of claim 1, wherein each preliminary route is associated with a plurality of features and the processors further:
for each of the plurality of features associated with the preliminary route, determine a value associated with the preliminary route as an input to one or more prediction models;
determine one or more outputs based on the one or more prediction models and the values of the plurality of features associated with the preliminary route;
determine a score based on the one or more outputs;
determine whether the score is larger than a second threshold; and
when the score is larger than the second threshold, determine the preliminary route as a premium route.

10. The system of claim 9, wherein the plurality of features comprise at least one of:
a total length of the preliminary route;
an estimated driving duration of the preliminary route;
charge information relating to the preliminary route; or
a number of the plurality of passengers.

11. A method configured to determine a route of a target transportation service of at least one of taxi hailing, chauffeur service, express car, carpool, bus service, driver hire and shuttle service through at least one electronic device having processors, at least one non-transitory storage medium, and a communication platform connected to a network, comprising:
  obtaining, by the processors, demand information of one or more transportation services from requestor terminals of a plurality of passengers, the demand information of each of the plurality of passengers including a start and a destination encompassed in a geographical area;
  accessing, by the processors, the at least one non-transitory storage medium via the communication bus and obtain a look-up table stored therein;
  converting, by the processors, coordinates of the geographical area into a first character string with a predetermined length based on the look-up table to reduce consumption of resources;
  dividing, by the processors, the geographical area into a plurality a subareas, each subarea being represented by a second character string;
  for each of the plurality of subareas,
    determining, by the processors, a number of starts and destinations encompassed by the subarea;
    determining, by the processors, whether the number of starts and destinations is more than a first threshold; and
    when the number of starts and destinations is more than the first threshold, determining, by the processors, the subarea as a preliminary stop area of a plurality of preliminary stop areas;
  determining, by the processors, at least one preliminary route passing through the plurality of preliminary stop ares;
  sending to and displaying the at least one preliminary route on user interfaces.

12. The method of claim 11, further comprising:
  obtaining, by the processors, records of a plurality of historical requests relating to the transportation service associated with the plurality of passengers;
  obtaining, by the processors, real-time demands relating to the transportation service from the plurality of passengers; and
  determining, by the logic-circuits processors, the demand information based on the records and the real-time demands.

13. The method of claim 11, further comprising:
  dividing, by the processors, a geographical area encompassing the plurality of starts and the plurality of destinations into a plurality of subareas;
  for each of the plurality of subareas,
    determining, by the processors, a number of starts and destinations encompassed by the subarea;
    determining, by the processors, whether the number of starts and destinations is more than a first threshold; and
    when the number of starts and destinations is more than the first threshold, determining, by the processors, the subarea as a preliminary stop area of the preliminary stop areas.

14. The method of claim 13, wherein the plurality of preliminary stop areas comprises a first preliminary stop area and a second preliminary stop area and the method further comprises:
  determining, by the processors, a first composite area encompassing the first preliminary stop area and a second composite area encompassing the second preliminary stop area;
  determining, by the processors, an overlapping area shared by the first composite area and the second composite area;
  determining, by the processors, an expanded overlapping area encompassing the overlapping area based on:
    a number of starts and destinations in the expanded overlapping area;
    a number of starts and destinations in the first composite area; and
    a number of starts and destinations in the second composite area.

15. The method of claim 14, further comprising:
  determining, by the processors, a sum of the number of starts and destinations in the first composite area and the number of starts and destinations in the second composite area;
  determining, by the processors, a ratio between the number of starts and destinations in the expanded overlapping area to the sum;
  determining, by the processors, whether the ratio is larger than a predetermined ratio; and
  when the ratio is larger than the predetermined ratio, determining, by the processors, the expanded overlapping area as a preliminary stop area.

16. The method of claim 11, wherein for each of the plurality of preliminary routes, further comprising:
  for each of the at least one preliminary route,
    determining, by the processors, whether the matching degree between the preliminary route and the existing route is larger than the first threshold; and
    when the matching degree between the preliminary route and the existing route is larger than the first threshold, deleting, by the processors, the preliminary route.

17. The method of claim 11, further comprising:
  for each of the at least one preliminary route,
  for each of the plurality of preliminary stop areas, determining, by the processors, a distance to the existing route;
  determining, by the processors, at least one redundant stop area in the preliminary route, wherein each of the at least one redundant stop area has a distance to the existing route shorter than a predetermined distance;
  determining, by the processors, a ratio between a number of the plurality of redundant stop areas to a number of the plurality of preliminary stop areas;
  determining, by the processors, the matching degree between the preliminary route and the existing route based on the ratio.

18. The method of claim 16, further comprising:
  for each of the at least one preliminary route,
    determining, by the processors, a plurality of distances, wherein each distance of the plurality of distance is a distance between one of a plurality of preliminary stop areas in a preliminary route and one of a plurality of existing stop areas in the existing route; and
    determining, by the processors, whether the preliminary route matches the existing route based on the plurality of distances.

19. The method of claim 11, wherein each preliminary route is associated with a plurality of features, and the method further comprising:
  for each of the plurality of features associated with the preliminary route, determining, by the processors, a value associated with the preliminary route as an input to one or more prediction models;

determining, by the processors, one or more outputs based on the one or more prediction models and the values of the plurality of features associated with the preliminary route;

determining, by the processors, a score based on the one or more outputs;

determining, by the processors, whether the score is larger than a second threshold; and when the score is larger than the second threshold, determining, by the processors, the preliminary route as a premium route.

20. The method of claim 19, wherein the plurality of features comprise at least one of:

a total length of the preliminary route;

an estimated driving duration of the preliminary route;

charge information relating to the preliminary route; or a number of the plurality of passengers.

* * * * *